United States Patent
Nahum et al.

(10) Patent No.: US 10,989,792 B2
(45) Date of Patent: Apr. 27, 2021

(54) TRANSMISSION DETECTION USING LINE OF SIGHT

(71) Applicant: ELBIT SYSTEMS LTD., Haifa (IL)

(72) Inventors: Tomer Nahum, Haifa (IL); Efrat Aharon, Haifa (IL); Assaf Koussewitzky, Haifa (IL)

(73) Assignee: Elbit Systems Ltd.

( * ) Notice: Subject to any disclaimer, the term of this patent is extended or adjusted under 35 U.S.C. 154(b) by 0 days.

(21) Appl. No.: 16/762,436

(22) PCT Filed: Nov. 7, 2018

(86) PCT No.: PCT/IL2018/051191
§ 371 (c)(1),
(2) Date: May 7, 2020

(87) PCT Pub. No.: WO2019/092706
PCT Pub. Date: May 16, 2019

(65) Prior Publication Data
US 2021/0063527 A1     Mar. 4, 2021

Related U.S. Application Data

(60) Provisional application No. 62/755,572, filed on Nov. 5, 2018.

(30) Foreign Application Priority Data

Nov. 7, 2017 (IL) .......................................... 255512

(51) Int. Cl.
*G01S 7/02* (2006.01)
*G01S 7/52* (2006.01)
*G01S 5/20* (2006.01)
*G01S 5/16* (2006.01)
(Continued)

(52) U.S. Cl.
CPC ................ *G01S 7/021* (2013.01); *G01S 5/14* (2013.01); *G01S 5/16* (2013.01); *G01S 5/20* (2013.01);
(Continued)

(58) Field of Classification Search
None
See application file for complete search history.

(56) References Cited

U.S. PATENT DOCUMENTS 3,922,533 A * 11/1975 Royal ...................... G01S 1/02
                                                                             342/442
6,212,471 B1    4/2001   Stiles et al.
(Continued)

FOREIGN PATENT DOCUMENTS

WO      1988009512 A1    12/1988
WO      1995019544 A1    7/1995
(Continued)

OTHER PUBLICATIONS

International Search Report and Written Opinion dated Feb. 28, 2019, for Application No. PCT/IL2018/051191.

*Primary Examiner* — Bernarr E Gregory
(74) *Attorney, Agent, or Firm* — Conley Rose, P.C.

(57) ABSTRACT

A method for automatically determining a potential transmission region, comprising: acquiring multiple binary indications for a direct line of sight between a transmitter and an airborne vehicle respective of multiple geo-positions of the airborne vehicle; acquiring each of the multiple geo-positions respective of each of the multiple binary indications for the direct line of sight; for each one of the acquired geo-positions, determining a layer of access respective of topographical data for the geographical region and the acquired geo-position, as a subset of the geographical region that includes at least one potential point defining a potential line of sight between the transmitter and the airborne vehicle,
(Continued)

thereby determining multiple layers of access; determining an intersection of the multiple layers of access; and determining, from the intersection, the potential transmission region respective of the transmitter and the geo-positions of the airborne vehicle.

10 Claims, 17 Drawing Sheets

(51) Int. Cl.
*G01S 7/48* (2006.01)
*G01S 5/14* (2006.01)
*G01S 5/00* (2006.01)
*G01S 7/00* (2006.01)

(52) U.S. Cl.
CPC ........ *G01S 7/4804* (2013.01); *G01S 7/52001* (2013.01)

(56) References Cited

U.S. PATENT DOCUMENTS

| | | |
|---|---|---|
| 6,222,464 B1 | 4/2001 | Tinkel et al. |
| 6,255,992 B1 | 7/2001 | Madden |
| 6,285,319 B1 * | 9/2001 | Rose .......................... G01S 5/12 342/449 |
| 7,243,008 B2 | 7/2007 | Stockdale et al. |
| 7,579,989 B2 * | 8/2009 | Winterling .............. G01S 7/021 342/450 |
| 7,848,879 B2 | 12/2010 | Herman |
| 8,009,515 B2 | 8/2011 | Cecala et al. |
| 8,185,256 B2 | 5/2012 | Herman |
| 9,163,949 B2 | 10/2015 | Andersson et al. |
| 9,255,808 B2 | 2/2016 | Andersson et al. |
| 9,632,168 B2 | 4/2017 | Moraites et al. |
| 9,759,802 B2 * | 9/2017 | May .......................... G01S 5/02 |
| 2012/0150484 A1 | 6/2012 | Odhner |
| 2012/0293371 A1 | 11/2012 | Lu |
| 2015/0241545 A1 | 8/2015 | Lehtomaki et al. |

FOREIGN PATENT DOCUMENTS

| | | |
|---|---|---|
| WO | 1995019547 A1 | 7/1995 |
| WO | 2003071465 A2 | 8/2003 |
| WO | 2004079400 A2 | 9/2004 |
| WO | 2010005424 A1 | 1/2010 |
| WO | 2013070123 A1 | 11/2011 |
| WO | 2013070122 A1 | 5/2013 |

* cited by examiner

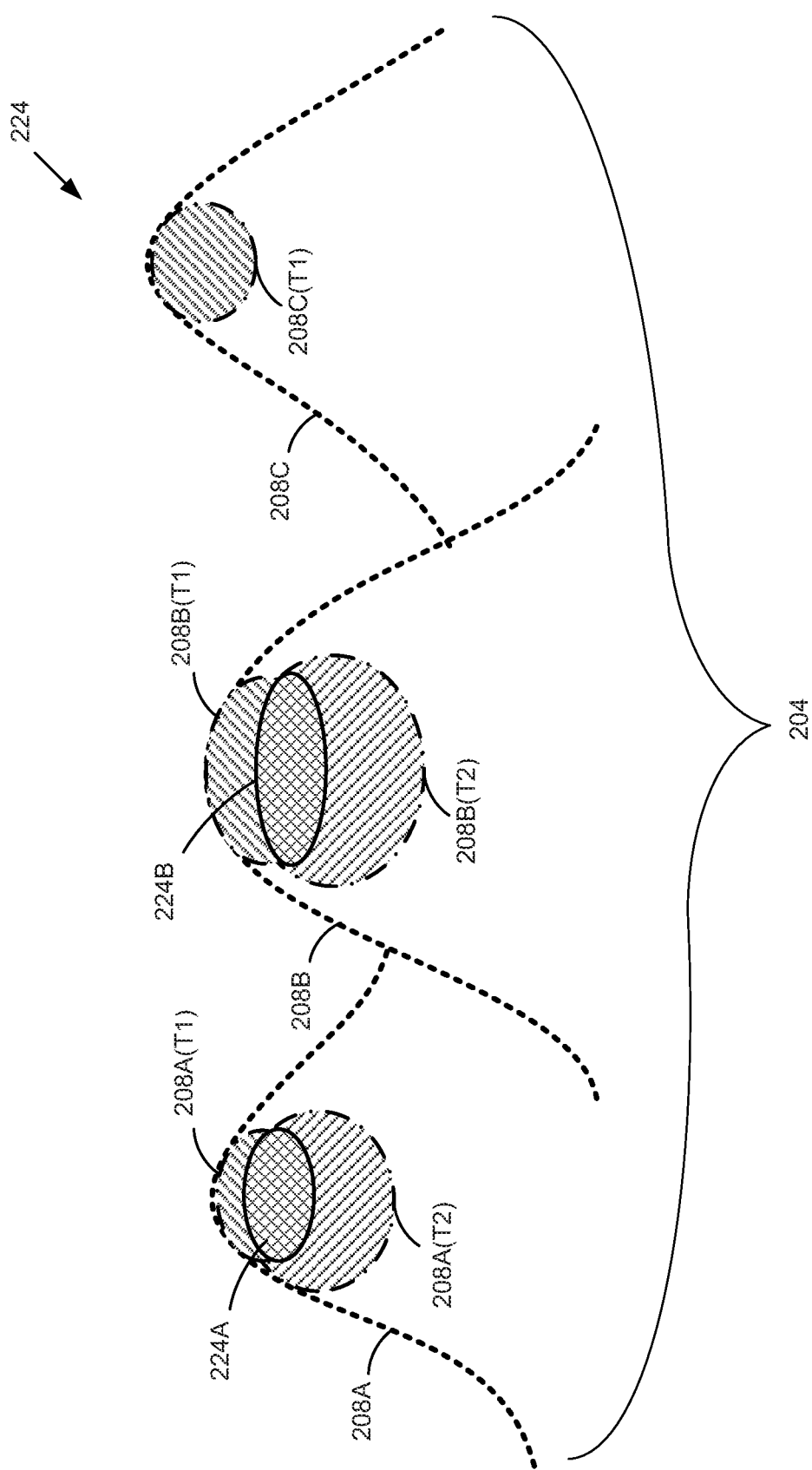

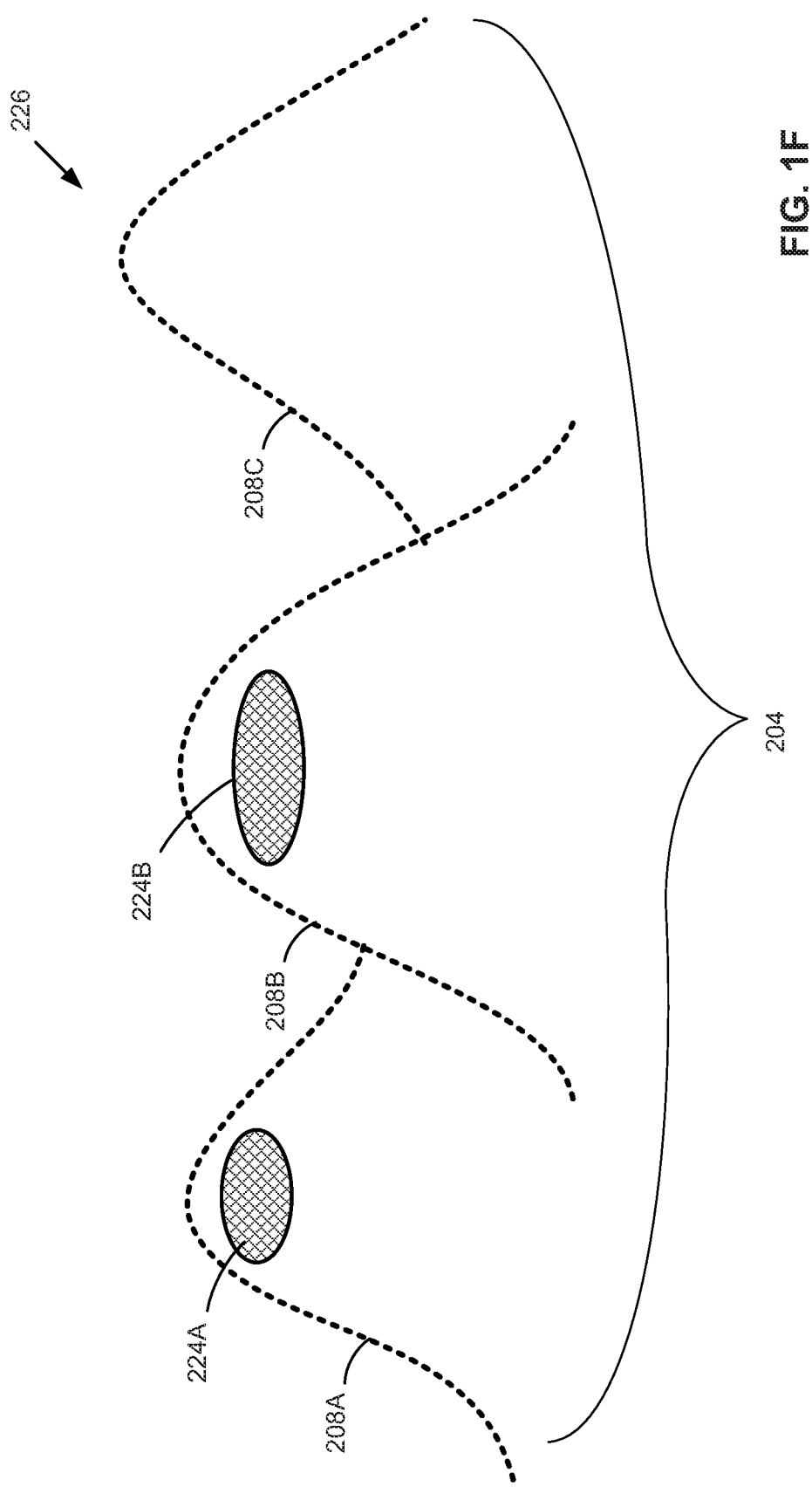

TRANSMISSION DETECTION USING LINE OF SIGHT

CROSS-REFERENCE TO RELATED APPLICATIONS

This application is a 35 U.S.C. § 371 national stage application of PCT/IL2018/051191 filed Nov. 7, 2018, entitled "Transmission Detection Using Line of Sight", which claims benefit of U.S. Application No. 62/755,572 filed Nov. 5, 2018, and priority to Application No. IL 255512 filed Nov. 7, 2017, both of which are incorporated herein by reference in their entirety.

FIELD OF THE DISCLOSED TECHNIQUE

The disclosed technique relates to transmission detection, in general, and to systems and methods for transmission detection using line of sight measurements, in particular.

BACKGROUND OF THE DISCLOSED TECHNIQUE

Detection systems for mobile objects, such as armored vehicles and the like, typically employ one or more sensors to detect a transmission directed towards the vehicle, such as a fired projectile, or a transmission by a tracking device, and the like. Such sensors may comprise receivers for detecting visual signals, acoustic signals, RADAR signals, and the like. On detecting one or more transmissions directed at the vehicle, these systems might issue a warning to the driver of the vehicle. Additionally, such systems might apply topographical data to compute for the vehicle an alternative route that is outside the transmitting range of the detected transmission.

U.S. Pat. No. 9,163,949B2 to Andersson, entitled "Dynamic Route Planner", and U.S. Pat. No. 9,255,808 B2 to Andersson, entitled "Route Planning System and Method for Minimizing Exposure to Threats", are directed to systems and methods for determining one or more alternative routes for a vehicle, responsive to detecting a shot fired at the vehicle. Based on the firing history, the system may issue a warning, and redirect the vehicle to the alternative route.

SUMMARY OF THE PRESENT DISCLOSED TECHNIQUE

It is an object of the disclosed technique to provide a novel method and system for automatically determining at least one potential transmission region.

In accordance with the disclosed technique, there is thus provided a method for automatically determining at least one potential transmission region, comprising: building multiple layers of access respective of a geographical region and a transmission, wherein each the layer of access of the multiple layers of access is associated with a different geo-position of at least one airborne vehicle; computing an intersection of the multiple layers of access; and determining, from the intersection, the at least one potential transmission region respective of the transmission and each of the different geo-positions of at least one airborne vehicle, wherein building each one of the multiple layers of access comprises: sensing state data of the at least one airborne vehicle comprising at least the geo-position associated with the one layer of access, sensing an indication for a direct line of sight between the transmission and the at least one airborne vehicle, while the at least one airborne vehicle is positioned at the geo-position associated with the one layer of access, obtaining topographical data for the geographical region, responsive to the sensing the indication for the direct line of sight, combining i) the indication for the direct line of sight, ii) the state data of the at least one airborne vehicle comprising at least the geo-position associated with the one layer of access, and iii) the topographical data for the geographical region to compute a subset of the geographical region that includes at least one potential point of the geographical region defining a potential line of sight between the transmission and the at least one airborne vehicle positioned at the geo-position associated with the one layer of access, the one layer of access comprising the subset of the geographical region.

In some embodiments, the state data further includes a parameter selected from the group consisting of: a time stamp associated with the sensing of the indication for the direct line of sight; a heading measurement for the at least one airborne vehicle; an altitude measurement for the at least one airborne vehicle; a pose measurement for the at least one airborne vehicle; a velocity measurement for the at least one airborne vehicle; and an acceleration measurement for the at least one airborne vehicle.

In some embodiments, the transmission is selected from the group consisting of: a threat signal; and a distress signal.

In some embodiments, the at least one airborne vehicle is selected from the group consisting of: a fixed wing aircraft; a helicopter; a drone; and a surveillance balloon.

In some embodiments, the transmission is selected from the group consisting of: an optical signal; a radio signal; a LIDAR signal; a RADAR signal, an acoustic signal, an ultrasound signal, a thermal signal; and any of a distance, amplitude, velocity, and acceleration associated with a projectile.

There is further provided, in accordance with an embodiment, an automatic transmission detection system for use with an airborne vehicle, comprising: at least one processor configured to: build multiple layers of access respective of a geographical region and a transmission, wherein each of the multiple layers of access is associated with a different geo-position of at least one airborne vehicle; compute an intersection of the multiple layers of access; and determine, from the intersection, at least one potential transmission region respective of each of the different geo-positions of the at least one airborne vehicle, wherein building each one of the multiple layers of access comprises: responsive to a sensing of an indication for a direct line of sight between the transmission and the at least one airborne vehicle while the at least one airborne vehicle is positioned at the geo-position associated with the one layer of access, combining i) the indication for the direct line of sight, ii) state data of the at least one airborne vehicle comprising at least the geo-position associated with the one layer of access, and iii) topographical data for the geographical region, to compute a subset of the geographical region that includes at least one potential point of the geographical region defining a potential line of sight between the transmission and the at least one airborne vehicle positioned at the geo-position associated with the one layer of access, the one layer of access comprising the subset of the geographical region; a memory unit configured to store the topographical data for the geographical region; at least one first sensor configured to sense the state data comprising at least each of the associated geo-positions of the at least one airborne vehicle; and at least one second sensor configured to sense each of the indications for direct line of sight between the transmission and the at least one airborne vehicle, while the at least one airborne vehicle is positioned at each of the geo-positions associated with each the respective layer of access.

In some embodiments, the system further comprises the at least one airborne vehicle, the at least one airborne vehicle provided with the at least one processor, the memory unit, the at least one first sensor, and the at least one second sensor.

In some embodiments, the at least one first sensor is selected from the group consisting of: a compass, a GPS unit, a 3D accelerometer, a gyroscope, and a camera.

In some embodiments, the at least one second sensor is selected from the group consisting of: a long range radio antenna, a LIDAR detector, a RADAR antenna, a thermal detector, an acoustic detector, an ultrasound detector, and a camera.

In some embodiments, the system of further comprises a user interface configured to display the at least one potential transmission region respective of each of the different geo-positions of at least one airborne vehicle.

BRIEF DESCRIPTION OF THE DRAWINGS

The disclosed technique will be understood and appreciated more fully from the following detailed description taken in conjunction with the drawings in which:

FIGS. 1A-1G are schematic illustrations of a system for detecting a potential transmitting region respective of at least one airborne vehicle moving over a geographical region, constructed and operative with an embodiment of the disclosed techniques;

DETAILED DESCRIPTION OF THE EMBODIMENTS

The disclosed technique overcomes the disadvantages of the prior art by providing a system and method for detecting a potential transmitting region respective of an airborne vehicle moving over a geographical region. The airborne vehicle is provided with one or more sensors that sense any combination of radio, optical, acoustic, thermal, LIDAR, and RADAR transmission signals that are transmitted by a transmitter positioned somewhere in the geographical region. The transmission signals may be communicated from a transmitter to the airborne vehicle for tracking purposes, attack purposes, alert or distress purposes, and the like. Additionally, each airborne vehicle is provided with one or more sensors that sense the geo-position of the vehicle at a given point in time, where geo-position is understood to be the real-world geolocation of the airborne vehicle respective of the elevation, longitude and latitude geo-coordinates. As the geo-position of the airborne vehicle changes over time, the sensors operative to detect the transmissions external to the airborne vehicle detect different indications of line of sight respective of the transmission signals. A processor may be provided with the airborne vehicle to determine a potential transmission region for the transmitter by combining multiple layers of access respective of the different geo-positions of the airborne vehicle. The processor builds each layer of access by combining a topographical map of the geographical region with the respective geo-position of the airborne vehicle and the line of site indications detected at the respective geo-position. As the processor combines additional layer of access, the potential transmission region is further reduced to provide a more accurate assessment for the position of the transmitter. This may be useful for assessing the location of a threat, such as an enemy tracking system, or projectile. Alternatively, determining the position of the transmitter may be useful for assessing the location of an ally, such as when the ally transmits a distress signal.

Line of sight (LOS), as referred to herein, is defined as the unobstructed straight line between a transmitter and a sensor. Therefore, when the sensor senses a transmission by the transmitter, this is a binary indication for direct line of sight, as defined in this application, validating the assumption that an unobstructed straight line exists between the transmitter and the sensor.

Figure 1A:
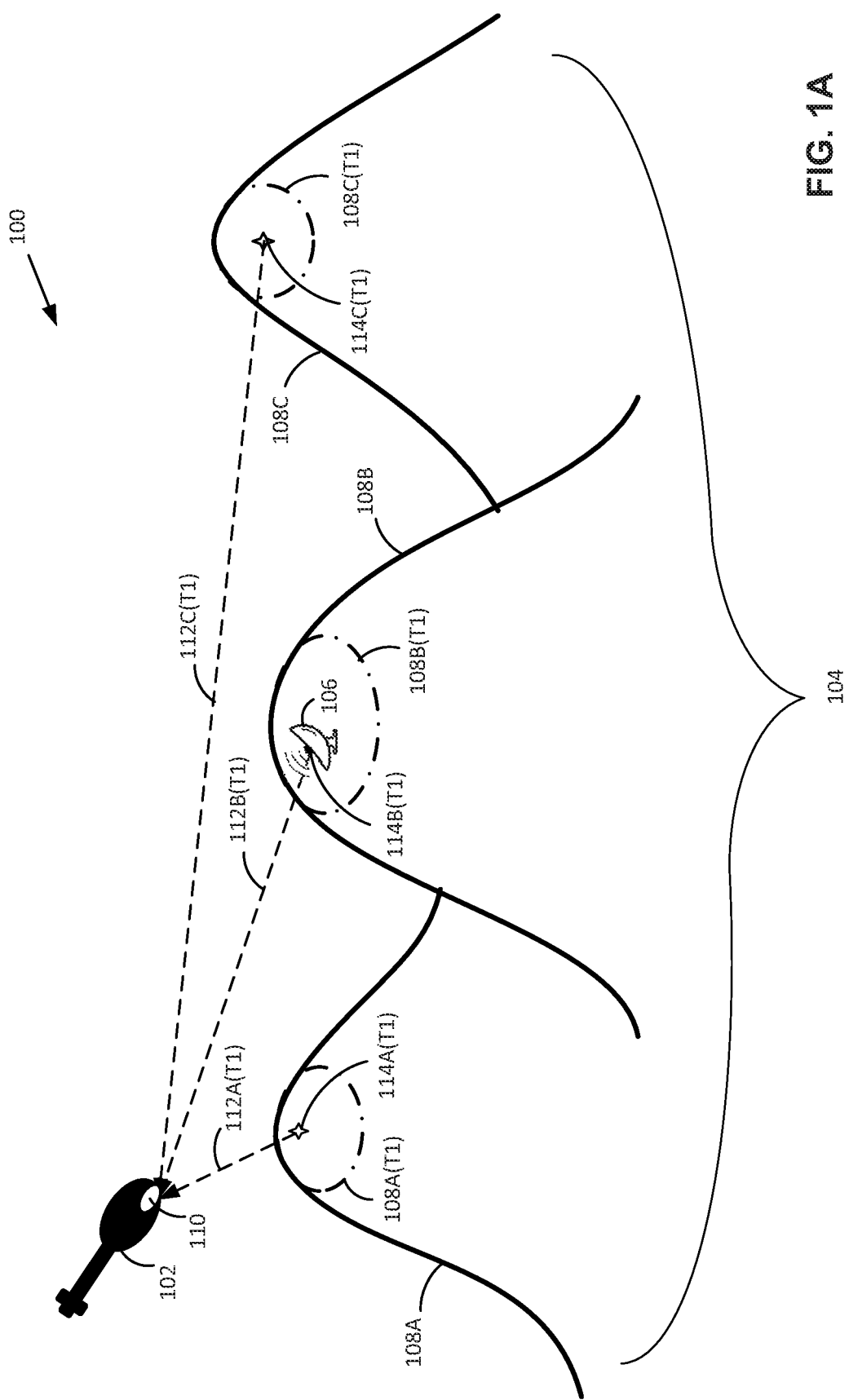
Figure 1B:
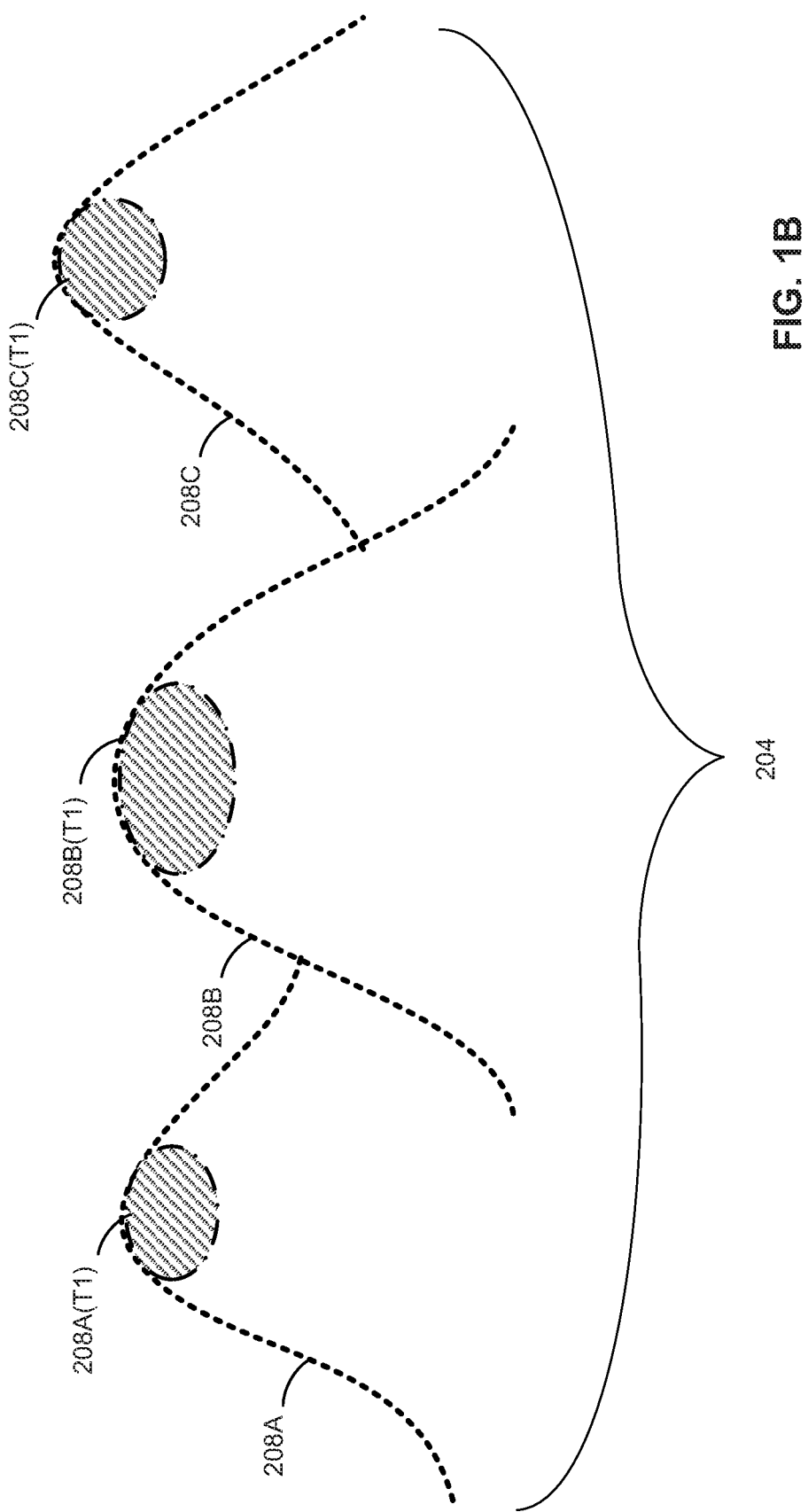
Figure 1C:
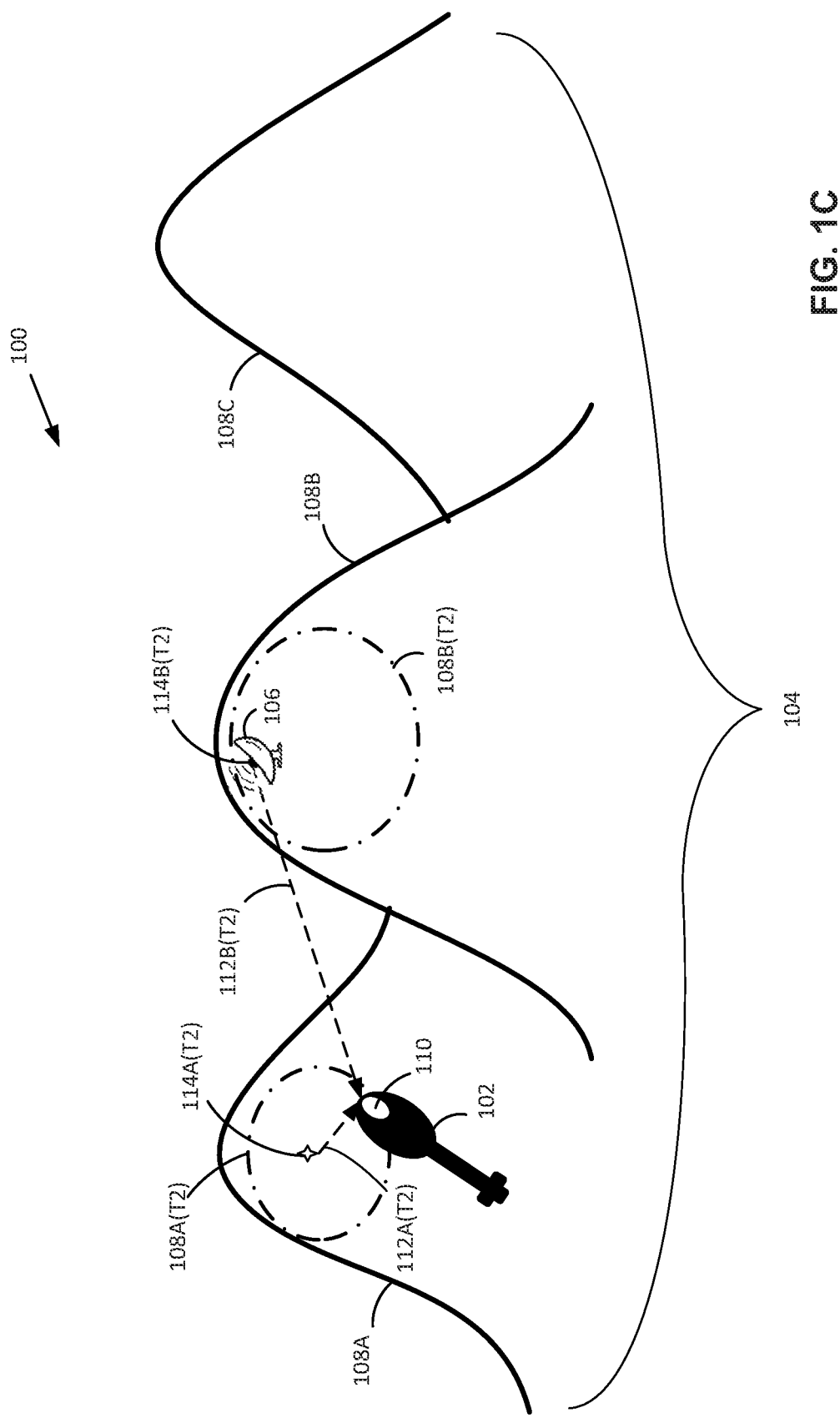
Figure 1D:
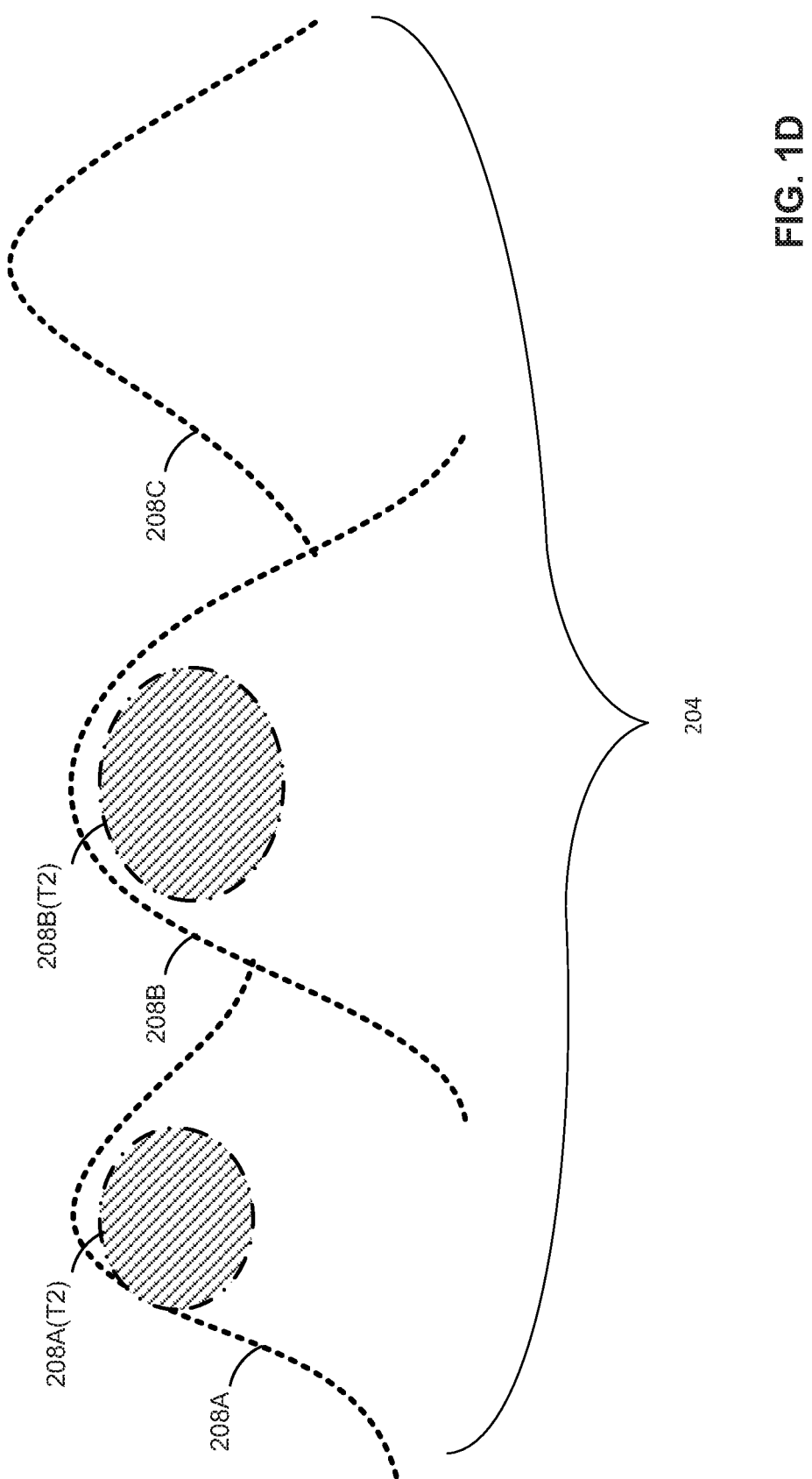

Reference is now made to FIGS. 1A-1G which are schematic illustrations of a system 100 for detecting a potential transmitting region respective of a transmitter 106 and at least one airborne vehicle 102 moving over a geographical region 104, constructed and operative with an embodiment of the disclosed techniques. Geographical region 104 includes one or more peaks and valleys, such as peaks 108A, 108B, and 108C. FIG. 1A illustrates system 100 at a time T1 with airborne vehicle positioned at a geo-position P(T1), and FIG. 1B illustrates a layer of access, Layer(P(T1)) corresponding to geo-position P(T1)) of FIG. 1A. FIG. 1C illustrates system 100 at a time T2, after airborne vehicle 102 has moved to another geo-position P(T2), and FIG. 1D illustrates a layer of access, Layer(P (T2)) corresponding to geo-position P(T2)) of FIG. 1C.

System 100 includes at least one computer 110. In one embodiment, computer 110 is provided with airborne vehicle 102. In another embodiment (not shown), computer 110 is provided separately from airborne vehicle 102, and is in communication with airborne vehicle 102 to receive one or more indications of a sensed transmission and sensed geo-positioning data respective of airborne vehicle 102. Although the system and methods described hereinbelow will relate to one airborne vehicle 102, the invention is applicable to multiple airborne vehicles 102 as well. A transmitter 106 is positioned at one of multiple potential transmitting regions within geographical region 104, such on top of one of peaks 108A, 108B and 108C, each of which poses a potential transmitting region. Transmitter 106 may be any of a LIDAR, RADAR, infrared (IR), radio, optical, acoustic, ultrasound (US), thermal or electric transmitter. In one implementation, the transmission is associated with a tracking system or a guided projectile system of an opponent. Alternatively, in another implementation, the transmission is a distress signal from an ally.

Computer 110 includes hardware componentry and software for acquiring the respective geo-position of airborne vehicle 102 from a geo-positioning sensor (not shown) provided with airborne vehicle 102 as the respective geo-position of airborne vehicle 102 changes with time, i.e. from time T1 to time T2. Additionally, computer 110 includes hardware componentry and software for acquiring indications of detections by a transmission sensor (not shown) provided with airborne vehicle 102 as the respective geo-position of airborne vehicle 102 changes with time. The transmission sensor detects one or more transmissions transmitted by transmitter 106 in the direction of airborne vehicle 102. Computer 110 is operative to apply the indications of the detected transmissions to determine one or more indications for line of sight respective of transmitter 106 and the current geo-position of airborne vehicle 102. Computer 110 additionally includes hardware componentry and software for storing topographical data respective of geographical region 104, as well as software instructions that are executable by computer 110. These and other components of computer 110, the transmission sensor and the geo-positioning sensor will be described in greater detail herein below in conjunction with FIG. 2. As airborne vehicle 102 moves and the respective geo-position of airborne vehicle 102 changes over time, computer 110 builds multiple layers of access respective of geographical region 104 and transmissions by transmitter 106. Each of the multiple layers of access is associated with a different geo-position of airborne vehicle 102. A description of the layers of access respective of each geo-location of airborne vehicle 102 now follows:

With reference to FIG. 1A, at time T1, airborne vehicle 102 is at geo-position, P(T1). While airborne vehicle 102 is positioned at geo-position P(T1), the transmission sensor (not shown) provided with airborne vehicle 102 senses one or more transmissions transmitted by transmitter 106 external to airborne vehicle 102. Computer 110 obtains indications, such a binary indication of the sensed transmissions at time T1. The transmission may be any combination of: a LIDAR, RADAR, IR, radio, optical, acoustic, ultrasound, thermal or electric signal. Airborne vehicle 102 additionally is provided with at least one geo-positioning sensor (not shown) for sensing state data corresponding to the physical state and geo-position of airborne vehicle 102. The geo-positioning sensor acquires the physical state data, including at least geo-position P(T1) i.e. the geo-position of airborne vehicle 102 at time T1, and may additionally include parameters such as the pose, velocity, acceleration, heading and timestamp T1 respective of the time of sensing. Computer 110 acquires the state data from the geo-positioning sensor and determines from the state data and the detected transmission, one or more indications for direct line of sight between transmitter 106 and airborne vehicle 102 positioned at geo-position P(T1), such as indications for direct lines of sight 112A(T1) respective of peak 108A, 112B(T1) respective of peak 108B, and 112C(T1) respective of peak 108C. Responsive to sensing the indications for direct line of sight 112A(T1), 112B(T1), and 112C(T1), computer 110 combines i) the state data, including at least P(T1), with ii) indications for direct line of sight 112A(T1), 112B(T1), and 112C(T1) and iii) the topographical data for geographical region 104 to compute a first subset of geographical region 104.

The first subset of geographical region 104 is indicated in FIG. 1A by the union of sub-regions 108A(T1), 108B(T1), and 108C(T1) respective of peaks 108A, 108B, and 108C. Each of sub-regions 108A(T1), 108B(T1) and 108C(T1) includes at least one potential point within geographical region 104 that defines a potential line of sight between the transmission by transmitter 106 and airborne vehicle 102 while positioned at P(T1). Each potential point is a potential location for transmitter 106, respective of geo-position P(T1), i.e. potential point 114A(T1) is determined respective of sub-region 108A(T1), potential point 114B(T1) is determined respective of sub-region 108B(T1), and potential point 114C(T1) is determined respective of sub-region 108C(T1). Each potential line of sight describes an unobstructed, observational perspective from each potential point to airborne vehicle 102. It is to be noted that FIG. 1A indicates three potential points respective of three sub-regions for illustrative purposes only. However each sub-region may include multiple potential points. Computer 110 builds a layer of access Layer(P(T1)) associated with geo-position P(T1) that and at least sub-regions 108A(T1), 108B(T1) and 108C(T1). A more detailed description of Layer(P(T1)) is given below with respect to FIG. 1B.

Referring to FIG. 1B, which is associated with FIG. 1A, a schematic illustration of layer of access Layer(P(T1)) built by computer 110 and overlaid on a digital terrain map (DTM) 204 of geographical region 104 is shown. DTM 204 may be provided in advance as a database and stored at a storage device of computer 110. Alternatively, computer 110 may build DTM 204 in real-time based on data acquired via a sensor, such as any of the components provided with transmission sensor 242 described hereinbelow with respect to FIG. 2, i.e. via a camera, RADAR antenna, LIDAR detector, radio receiver i.e. antenna, acoustic detector, sonar (US) detector, thermal detector, and the like. Layer(P(T1)) is built respective of geo-position P(T1) of airborne vehicle 102 at time T1. Layer of access Layer (P(T1)) includes the union of three representative sub-regions 208A(T1), 208B (T1) and 208C(T1) of a DTM 204 of geographical region 104, and corresponding to respective sub-regions 108A(T1), 108B(T1) and 108C(T1) of peaks 108A, 108B, and 108C. Peaks 208A, 208B, and 208C represent peaks 108A, 108B, and 108C, and are obtained from the topographical data of geographical region 104 stored in a memory unit of computer 110. Each of representative sub-regions 208A(T1), 208B(T1) and 208C(T1) includes at least one potential point representing a potential line of sight between the transmission by transmitter 106 and airborne vehicle 102 while positioned at geo-position P(T1), and resulting from sub-regions 108A(T1), 108B(T1) and 108C(T1) of peaks 108A, 108B, and 108C being within direct line of sight of airborne vehicle 102 at geo-position P(T1).

With reference to FIG. 1C, at time T2, airborne vehicle 102 moves to a second geo-position, P(T2). While airborne vehicle 102 is positioned at geo-position P(T2), the transmission sensor of airborne vehicle 102 senses one or more transmissions transmitted by transmitter 106. The transmission may be any combination of: a LIDAR, RADAR, IR, radio, optical, acoustic, ultrasound, thermal or electric signals. Computer 110 obtains indications, such as a binary indication of the sensed transmissions at time T2. The geo-positioning sensor provided with airborne vehicle 102 senses state data that includes at least geo-position P(T2) of airborne vehicle 102, i.e. the geo-position of airborne vehicle 102 at time T2, and may additionally include the pose, velocity, acceleration, heading and timestamp T2 respective of the time of sensing. Computer 110 acquires the state data from the geo-positioning sensor and determines from the detected transmission one or more indications for direct line of sight between a transmission transmitted by transmitter 106 and airborne vehicle 102 positioned at P(T2). While positioned at P(T2), peaks 108A and 108B are within the line of sight from airborne vehicle 102, however peak 108C is outside the line of sight from airborne vehicle 102. Accordingly, computer 110 senses indications for direct line of sight 112A(T2) and 112B(T2), respective of peaks 108A, and 108B. Responsive to sensing the indications for direct line of sight 112A(T2) and 112B(T2), computer 110 combines i) the state data, including geo-position P(T2), with ii) indications for direct line of sight 112A(T2) and 112B(T2), and iii) the topographical data for geographical region 104 to compute a second subset of geographical region 104.

The second subset of geographical region 104 is indicated in FIG. 1C by the union of sub-regions 108A(T2), and 108B(T2), respective of peaks 108A and 108B. Each of sub-regions 108A(T2) and 108B(T2) includes at least one potential point within geographical region 104 that defines a potential line of sight between the transmission by transmitter 106 and airborne vehicle 102 while positioned at P(T2). Each potential point is a potential location for transmitter 106, respective of geo-position P(T2), i.e. potential point 114A(T2) is determined respective of sub-region 108A (T2), and potential point 114B(T2) is determined respective of sub-region 108B(T2). As with FIG. 1A, each sub-region may include multiple potential points. Computer 110 builds a layer of access Layer(P(T2)) associated with geo-position P(T2) that and at least sub-regions 108A(T2) and 108B(T2).

Referring to FIG. 1D, which is associated with FIG. 1C, a schematic illustration of layer of access Layer(P(T2)), as built by computer 110 respective of geo-position P(T2) of airborne vehicle 102 at time T2 is shown. Layer of access Layer (P(T2)) includes the union of only two representative sub-regions 208A(T2), and 208B(T2) of DTM 204 of geographical region 104, and corresponding to respective sub-regions 108A(T2) and 108B(T2) of FIG. 1C. Each of representative sub-regions 208A(T2) and 208B(T2) includes at least one potential point representing a potential line of sight between the transmission by transmitter 106 and airborne vehicle 102 while positioned at geo-position P(T2), and resulting from only sub-regions 108A(T2), 108B(T2) of peaks 108A and 108B being within direct line of sight of airborne vehicle 102 at geo-position P(T2).

As shown in FIG. 1E, computer 110 creates a superimposition 224 by overlaying layer of access Layer(P(T1)), associated with geo-position P(T1) with layer of access Layer(P(T2)), associated with geo-position P(T2). Superimposition 224 includes representative sub-regions 208A(T1), 208B(T1), and 208C(T1) overlaid on representative sub-regions 208A(T2) and 208B(T2). As a result of the overlaying, superimposition 224 includes representative overlap regions 224A and 224B, corresponding to the non-zero overlap, or intersection between representative sub-regions 208A(T1) and 208B(T1) with representative sub-regions 208A(T2) and 208B(T2), i.e. those points that are common to both representative sub-regions 208A(T1) and 208B(T1) and representative sub-regions 208A(T2) and 208B(T2). Since peak 208C was not within line of sight of airborne vehicle 102 at geo-position P(T2)), the overlap respective of sub-region 208C(T2) of Layer(P(T1)) 220 with Layer (P(T2)) 222 is the null set.

As shown in FIG. 1F, computer 110 determines intersection 226 by extracting representative overlap regions 224A and 224B from superimposition 224 of FIG. 2D and overlaying overlap regions 224A and 224B on DTM 204. Computer 110 determines from representative overlap regions 224A and 224B of intersection 226 at least one potential transmission region respective of each of the different geo-positions, i.e. P(T1) and P(T2) of airborne vehicle 102. In this manner, computer 110 narrows down the potential transmission region from the entire geographic region 104 to sub-regions within geographic region 104 corresponding to representative overlap regions 224A and 224B of intersection 226.

As airborne vehicle 102 moves to additional geo-positions over time, additional indications, such as binary indications for lines of sight respective of the addition geo-positions, are sensed. Computer 110 may build additional layers of access associated with the additional geo-positions. Similarly, additional layers of access may be built by additional computers associated with additional airborne vehicles (not shown).

Figure 1G:
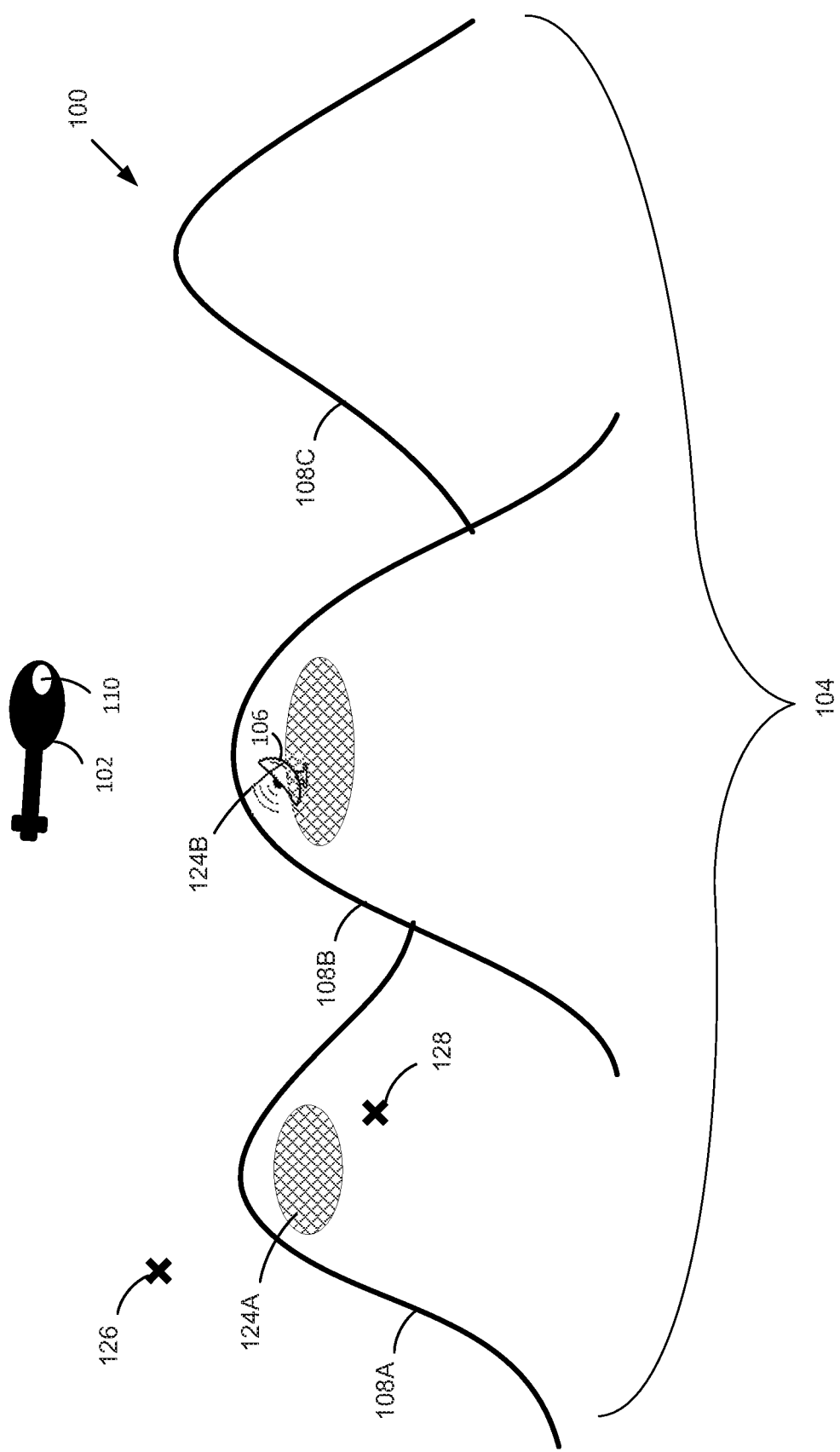

Referring to FIG. 1G, system 100 is illustrated corresponding to FIG. 1F. Computer 110 of airborne vehicle 102 uses representative overlap regions 224A and 224B of respective Layer(P(T1)) and Layer(P(T2)) to determine each of regions 124A and 124B on respective peaks 108A and 108B as a potential transmission region for transmitter 106. Potential transmission regions 124A and 124B are defined respective of the geo-position of airborne vehicle 102 at time T1, i.e. P(T1), indicated by an "X" 126, and the geo-position of airborne vehicle 102 at time T2, i.e. P(T2), indicated by an "X" 128. Optionally, computer 110 of airborne vehicle 102 displays indications for regions 124A and 124B on a user interface provided with computer 110. In one embodiment, the user interface is an augmented reality display, and regions 124A and 124B are displayed as features overlaid on a real-time rendition of geographic region 104. A description of a system and method for determining regions 124A and 124B on respective peaks 108A and 108B now follows.

Figure 2:
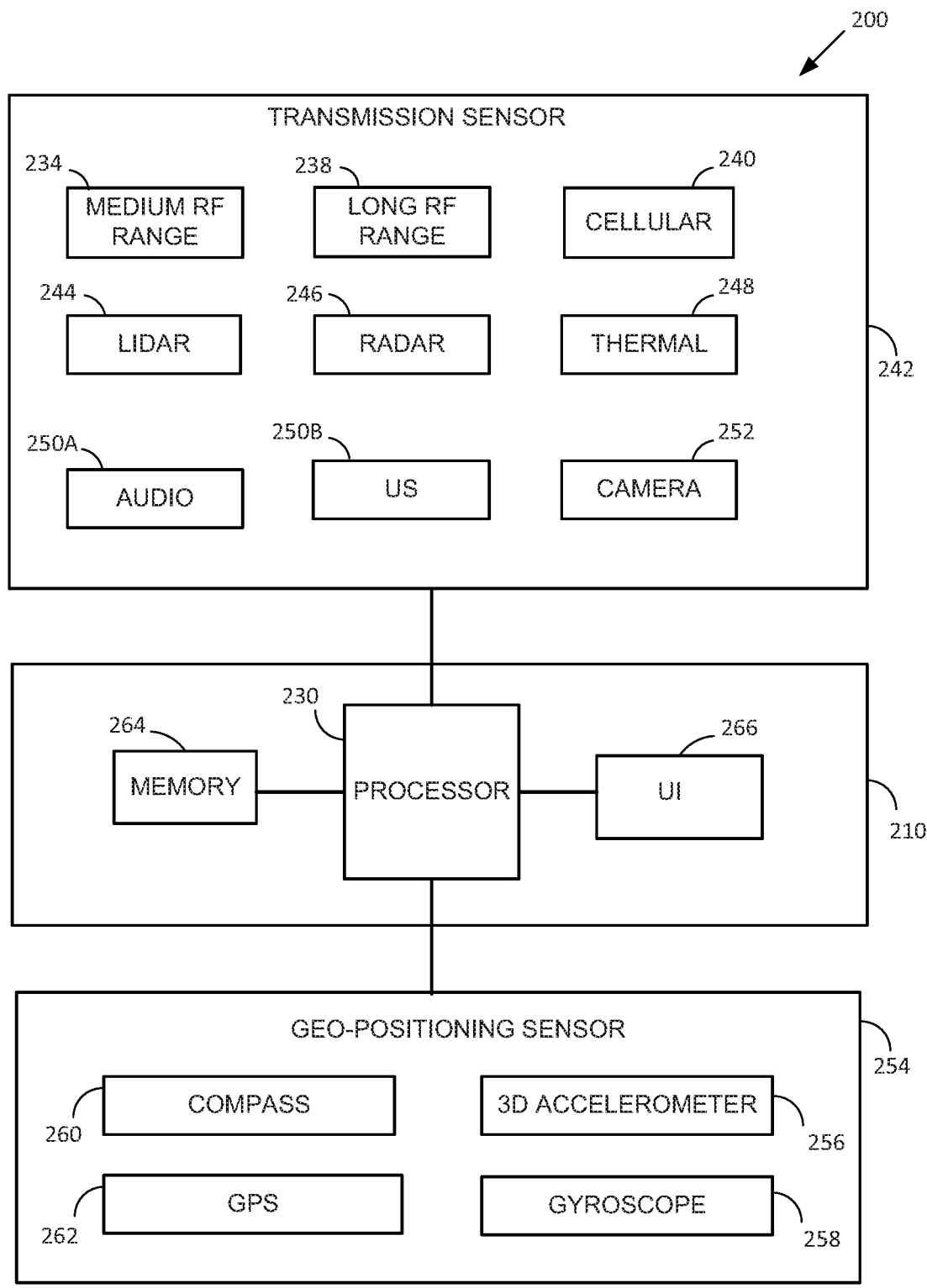
FIG. 2 is a schematic illustration of the system of FIGS. 1A-1G, constructed and operative in accordance with another embodiment of the disclosed techniques.

Reference is now made to FIG. 2, which, while still referencing FIGS. 1A-1G, is a schematic illustration of a system 200 including a computer, generally referenced 210, a transmission sensor 242, and a geo-positioning sensor 254, constructed and operative in accordance with another embodiment of the disclosed techniques. Computer 210, transmission sensor 242, and geo-positioning sensor 254 are provided by way of example, and are representative, respectively, of computer 110, the transmission sensor, and the geo-positioning sensor described above with respect to FIGS. 1A-1G.

Computer 210 includes at least one processor 230. Processor 230 may be any of a CPU, GPU, or APU, digital signal processor (DSP), and the like. Computer additionally includes a memory 264, and a user interface 266. Memory 264, and user interface 266 are electrically coupled to processor 230.

Transmission sensor 242 includes one or more of: a medium range RF transceiver 234 (e.g., WIFI), a long range transceiver 238, such as in the FM or AM range, and a cellular communication transceiver 240 (e.g., GSM, LTE, WIMAX). In one implementation, transmission sensor 242 is operative to send and receive radio frequency (RF) signals relating to data and executable instructions for executing one or more of the procedures described herein. Transmission sensor 242 may additionally include one or more of: a LIDAR detector 244 operative to detect a Light Detection and Ranging (LIDAR) signal, a RADAR antenna 246 operative to detect a RADAR signal, a thermal detector 248 operative to detect a thermal signal, an acoustic detector 250A operative to detect acoustic signals, an ultrasound (US) detector 250B operative to detect ultrasound signals, and one or more cameras 252 configured to detect spectra within any of the visible, infrared, or ultra-violet range. Camera 252 may be any combination of a monoculer camera, a stereoscopic camera, a scanning camera, and combinations thereof.

Geo-positioning sensor 254 is operative to perform real-time spatial tracking and geo-positioning of any combination of absolute and relative translational and rotational motion of airborne vehicle 102. Geo-positioning sensor 254 includes at least a 3D accelerometer unit 256, a gyroscope 258, and a compass 260, that are collectively operative to perform 9-axis inertial measurements respective of airborne vehicle 102. Geo-positioning sensor 254 additionally includes a GPS receiver 262 operative to receive global geo-positioning measurements respective of airborne vehicle 102.

Memory unit 264 is operative to store one or more software instructions executable by processor 232. Memory unit 264 is additionally operative to store topographical data respective of a geographical region, such as region 104. Memory unit 264 is additionally operative to store any results from executing the software instructions, such as layers of access Layer(P(T1)) 220, and Layer(P(T2)), superimposition 224 and intersection 226 described above in with respect to FIGS. 1B, and 1D-1F. User interface 266 operative to display one or more graphical features, such as Layer(P(T1)), and Layer(P(T2)), superimposition 224 and intersection 226 respective of a representation 204 of geographical region 104. User interface (UI) 266 includes at least a display for displaying any of layers of access Layer (P(T1)), and Layer(P(T2)), superimposition 224 and intersection 226. UI 266 may be any of a heads-up display, augmented reality display, virtual reality display, flat screen display, and the like.

In one embodiment, transmission sensor 242 and the components included therein described above, are coupled to processor 230 via a respective converter, i.e. an analog to digital converters ADCs, and a digital to analog converter DACs, (not shown). Alternatively, in another embodiment, transmission sensor 242 and components included therein are coupled to computer 210 wirelessly, such as via electromagnetic or optical communications means. Geo-positioning sensor 254 and the components included therein described above, is communicatively coupled to processor 230, such as via wired, or wireless, e.g. electromagnetic or optical, communications means. Memory unit 254 and UI 266 are electrically coupled to processor 230.

Processor 230 determines any of the absolute and relative geo-position of airborne vehicle 102 according to any combination of: measurements acquired by geo-positioning unit 254, and transmission sensor 242. For example, processor 230 may apply one or more GPS measurements acquired by GPS 262 with one or more measurements acquired by any of compass 260, 3D accelerometer 256, and gyroscope 258, and one or more transmissions received by transmission sensor 242, such as images acquired by camera 252, to determine a relative or absolute geo-positioning of airborne vehicle 102 respective of geographical region 104 and transmitter 106. Processor 230 may additionally apply data received via an operating system configured with computer 210 to determine a relative or absolute geo-positioning of airborne vehicle 102 respective of geographical region 104 and transmitter 106.

In general, processor 230 receives translational and rotational motion information from 3D accelerometer 256 and gyroscope 258, and changes in absolute orientation from compass 260. Additionally, processor 230 periodically receives positioning information from GPS 262, and one or more images from camera 252. Processor 230 applies the information received from compass 260, 3D accelerometers 256, gyroscope 258, and GPS 262, and optionally camera 252 to determine and update the geo-position of airborne vehicle 102. Gyroscope 258 measures rotational velocity of airborne vehicle 102. 3D accelerometer 256 measures the acceleration of airborne vehicle 102. Processor 230 acquires the data measured by geo-positioning sensor 254 to compute the elevation and the roll of the mechanical frame of airborne vehicle 102 with respect to the vertical direction. Compass 260 measures the Earth's magnetic field vector affecting airborne vehicle 102. Additionally, one or more signals received via transceiver 232 may be used to correct for drift, noise and the like.

Processor 230 periodically receives indications of any of: a LIDAR signals detected via LIDAR detector 244; a RADAR signal detected via RADAR antenna 246; a thermal signal detected via thermal detector 248; an acoustic signal detected via acoustic detector 250A; an ultra-sound signal detected via US 250B; and one or more images acquired via camera 252 to detect an indication for potential line-of-sight respective of a transmission by transmitter 106.

Reference is now made to FIGS. 3A-3G which, taken together, are a schematic illustration of a system 300 for detecting a potential transmitting region respective of at least one airborne vehicle 302 moving over a geographical region 304, constructed and operative with another embodiment of the disclosed techniques. System 300 is substantially similar to system 100 described above with respect to FIGS. 1A-1G. System 300 includes at least one airborne vehicle 302 provided with a computer 310. Computer 310 may be represented by computer 210 of FIG. 2. System 300 additionally includes a transmission sensor (not shown) and a geo-positioning sensor (not shown) provided with airborne vehicle 302, such as corresponding to transmission sensor 242, and geo-positioning sensor 254 of FIG. 2.

Figure 3A:
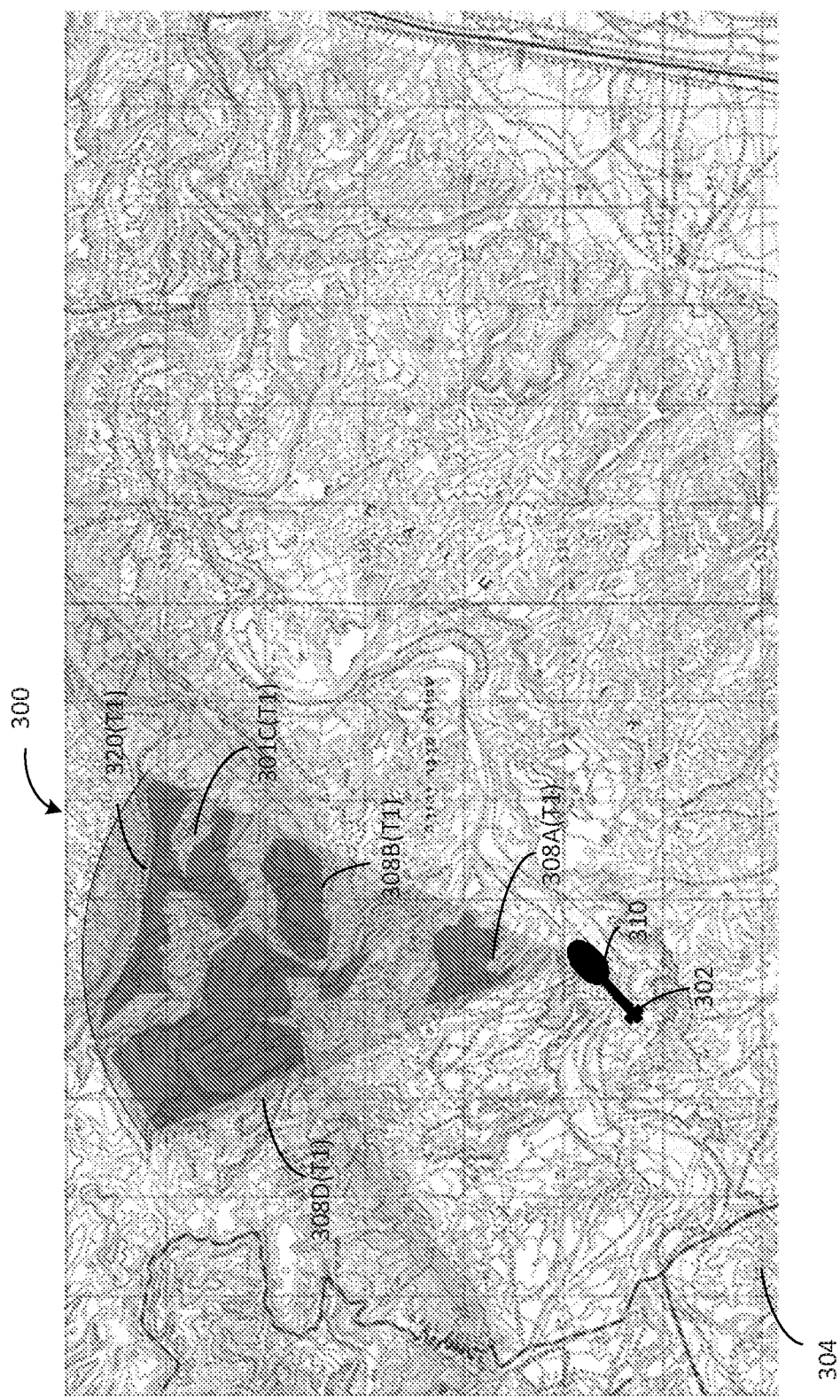
FIGS. 3A-3G are schematic illustrations of another system for detecting a potential transmitting region respective of at least one airborne vehicle moving over a geographical region, constructed and operative with an embodiment of the disclosed techniques.

With reference to FIG. 3A, at a time T1, airborne vehicle 302 is positioned at a geo-position $P_{302}(T1)$. While airborne vehicle 302 is positioned at geo-position $P_{302}(T1)$, the transmission sensor of airborne vehicle 302 senses one or more transmissions transmitted by a transmitter (not shown). Computer 310 acquires an indication, such as a binary indication of the sensed transmission and determines from the one or more transmissions sensed at time T1, one or more indications for direct line of sight between the transmitter and airborne vehicle 302. The geo-positioning sensor of airborne vehicle 302 senses state data that includes at least geo-position $P_{302}(T1)$ of airborne vehicle 302 at time T1. Computer 310 acquires the state data, and applies a DTM of geographical region 304 to build a layer of access 320(T1), using the techniques described above with respect to FIGS. 1A-1G. Layer of access 320(T1) includes the union of sub-regions 308A(T1), 308B(T1), 308C(T1), and 308D(T1). Each of sub-regions 308A(T1), 308B(T1), 308C(T1), and 308D(T1) includes at least one potential point within geographical region 304 that defines a potential line of sight between the transmission and airborne vehicle 302 while positioned at $P_{302}(T1)$.

Figure 3B:
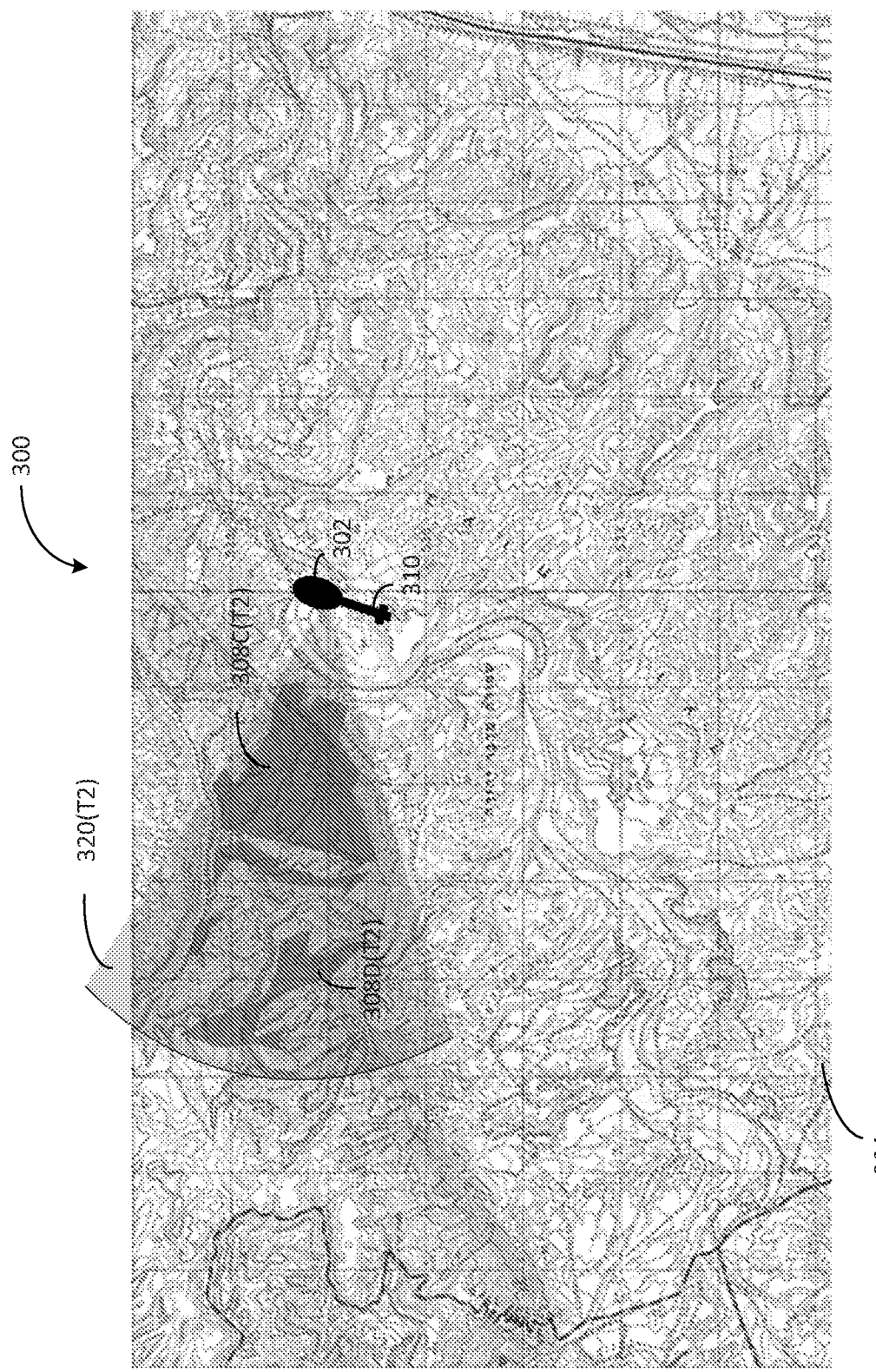

With reference to FIG. 3B, at a time T2, airborne vehicle 302 has moved and is now positioned at a geo-position $P_{302}(T2)$. While airborne vehicle 302 is positioned at geo-position $P_{302}(T2)$, the transmission sensor of airborne vehicle 302 senses one or more transmissions transmitted by the transmitter. Computer 310 acquires an indication, such as a binary indication of the sensed transmission and determines from the one or more transmissions sensed at time T2, one or more indications for direct line of sight between the transmitter and airborne vehicle 302. The geo-positioning sensor of airborne vehicle 302 senses state data that includes at least geo-position $P_{302}(T2)$ of airborne vehicle 302 at time T2. Computer 310 acquires the state data, and applies a DTM of geographical region 304 to build a layer of access 320(T2), using the techniques described above with respect to FIGS. 1A-1G. Layer of access 320(T2) includes the union of sub-regions 308C(T2), and 308D(T2). Each of sub-regions 308C(T2), and 308D(T2) includes at least one potential point within geographical region 304 that defines a potential line of sight between the transmission and airborne vehicle 302 while positioned at $P_{302}(T2)$.

Figure 3C:
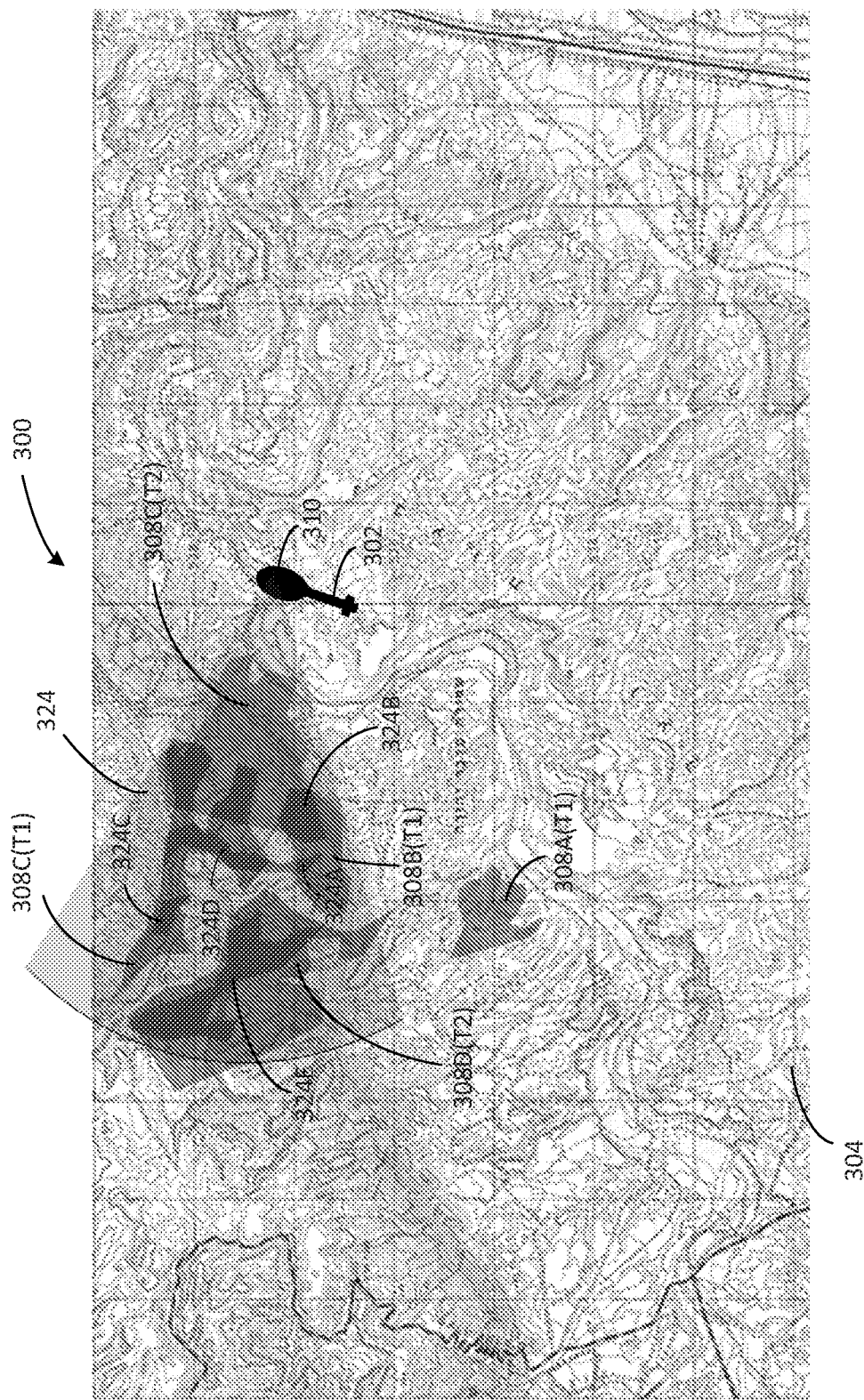

With reference to FIG. 3C, computer 310 creates a superimposition 324 by overlaying layer of access 320(T1) of FIG. 3A, and associated with geo-position $P_{302}(T1)$ with layer of access 320(T2) of FIG. 3B, and associated with geo-position $P_{302}(T2)$. Superimposition 324 includes sub-regions 308A(T1), 308B(T1), and 308C(T1) overlaid on sub-regions 308C(T2) and 308D(T2). As a result of the overlaying, superimposition 324 includes overlap regions 324A, 324B, 324C, 324D, and 324E overlaid on DTM 304, and corresponding to the intersection, i.e. those points that are common to both sub-regions 308A(T1), 308B(T1), and 308C(T1) and sub-regions 308C(T2) and 308D(T2).

Figure 3D:
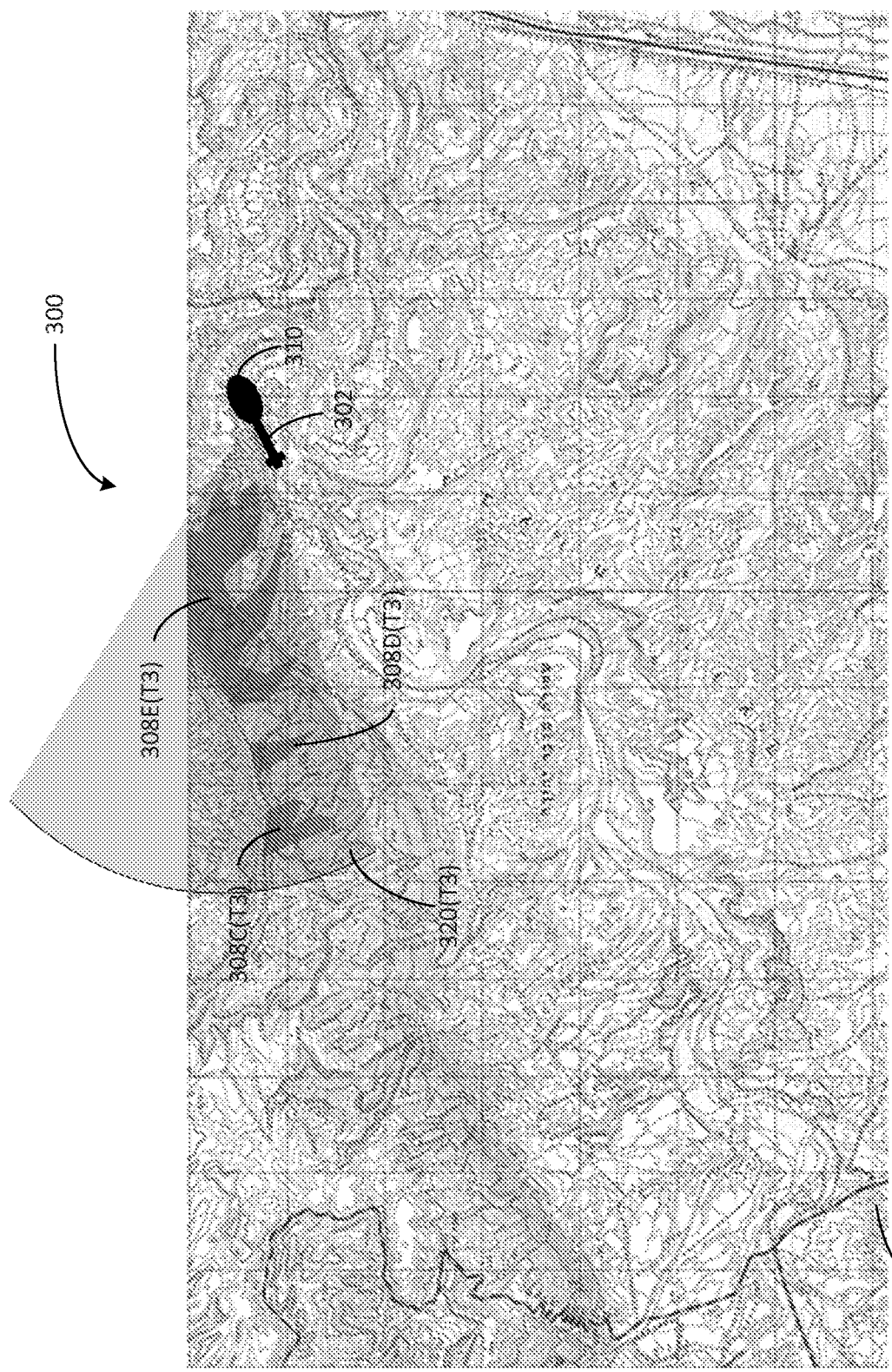

With reference to FIG. 3D, at a time T3, airborne vehicle 302 has moved and is now positioned at a geo-position $P_{302}(T3)$. While airborne vehicle 302 is positioned at geo-position $P_{302}(T3)$, the transmission sensor of airborne vehicle 302 senses one or more transmissions transmitted by the transmitter. Computer 310 acquires an indication, such as a binary indication of the sensed transmission and determines from the one or more transmissions sensed at time T3, one or more indications for direct line of sight between the transmitter and airborne vehicle 302. The geo-positioning sensor of airborne vehicle 302 senses state data that includes at least geo-position $P_{302}(T3)$ of airborne vehicle 302 at time T3. Computer 310 acquires the state data, and applies a DTM of geographical region 304 to build a layer of access 320(T3), using the techniques described above with respect to FIGS. 1A-1G. Layer of access 320(T3) includes the union of sub-regions 308C(T3), 308D(T3), and 308E(T3). Each of sub-regions 308C(T3), 308D(T3), and 308E(T3) includes at least one potential point within geographical region 304 that defines a potential line of sight between the transmission and airborne vehicle 302 while positioned at $P_{302}(T3)$.

Figure 3E:
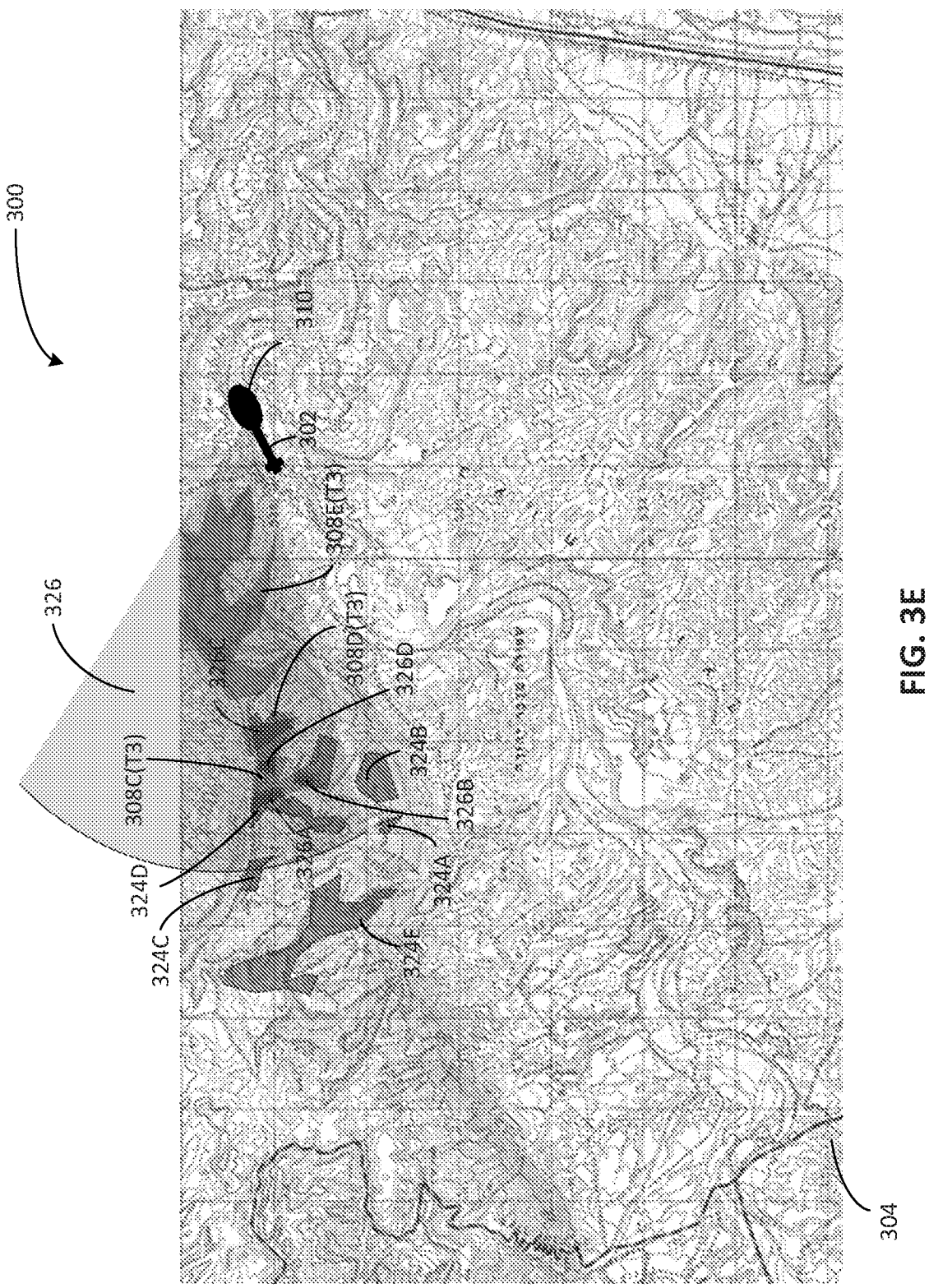

With reference to FIG. 3E, computer 310 creates a superimposition 326 by overlaying layer of access 320(T3) of FIG. 3D, and associated with geo-position $P_{302}(T3)$ with overlap regions 324A, 324B, 324C, 324D, and 324E, determined above with respect to FIG. 3C. Superimposition 326 includes sub-regions 308C(T3), 308D(T3), and 308EC(T3) overlaid on overlap regions 324A, 324B, 324C, 324D, and 324E. As a result of the overlaying, superimposition 326 includes overlap regions 326A, 326B, 326C, and 326D, overlaid on DTM 304, and corresponding to the intersection, i.e. those points that are common to each of sub-regions 308A(T1), 308B(T1), 308C(T1), and 308D(T1) associated with $P_{302}(T1)$, sub-regions 308C(T2), and 308D(T2) associated with $P_{302}(T2)$, and sub-regions 308C(T3), 308D(T3), and 308E(T3) associated with $P_{302}(T3)$.

Figure 3F:
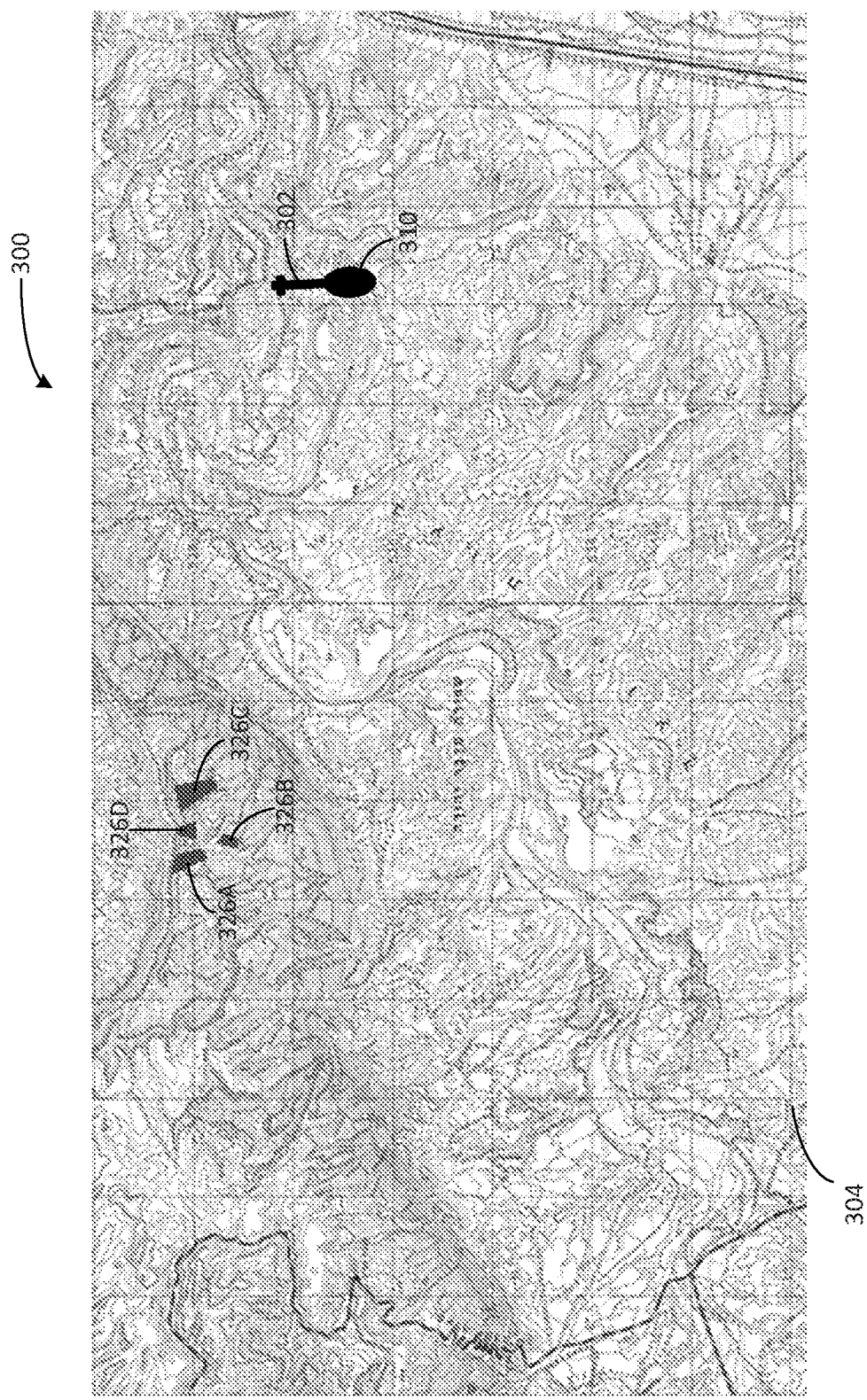

With reference to FIG. 3F, computer 310 extracts overlap regions 326A, 326B, 326C, and 326D from superimposition 326, and overlays these regions on DTM map 304. As a result of the techniques described above, the potential region of transmission at time T3 is considerably smaller than at time T1.

Figure 3G:
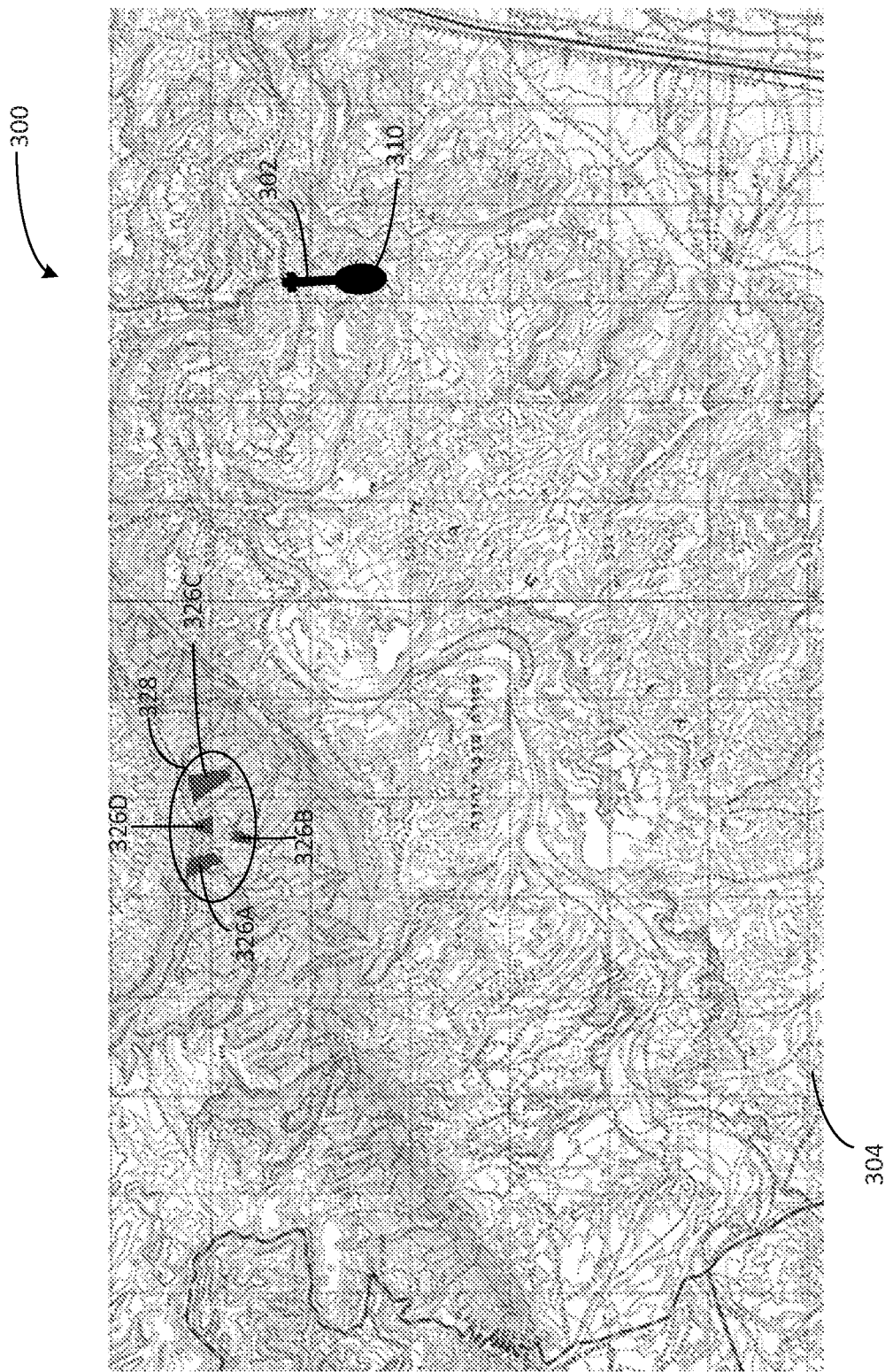

With reference to FIG. 3G, computer 310 defines a general transmission region 328, including overlap regions 326A, 326B, 326C, and 326D. Computer 310 may display any of region 328 and overlap regions 326A, 326B, 326C, and 326D on a user interface, such as UI 266 of FIG. 2. In one embodiment, computer 310 displays region 328 and overlap regions 326A, 326B, 326C, and 326D on an augmented reality display of the geographical region represented by DTM 304.

Figure 4A:
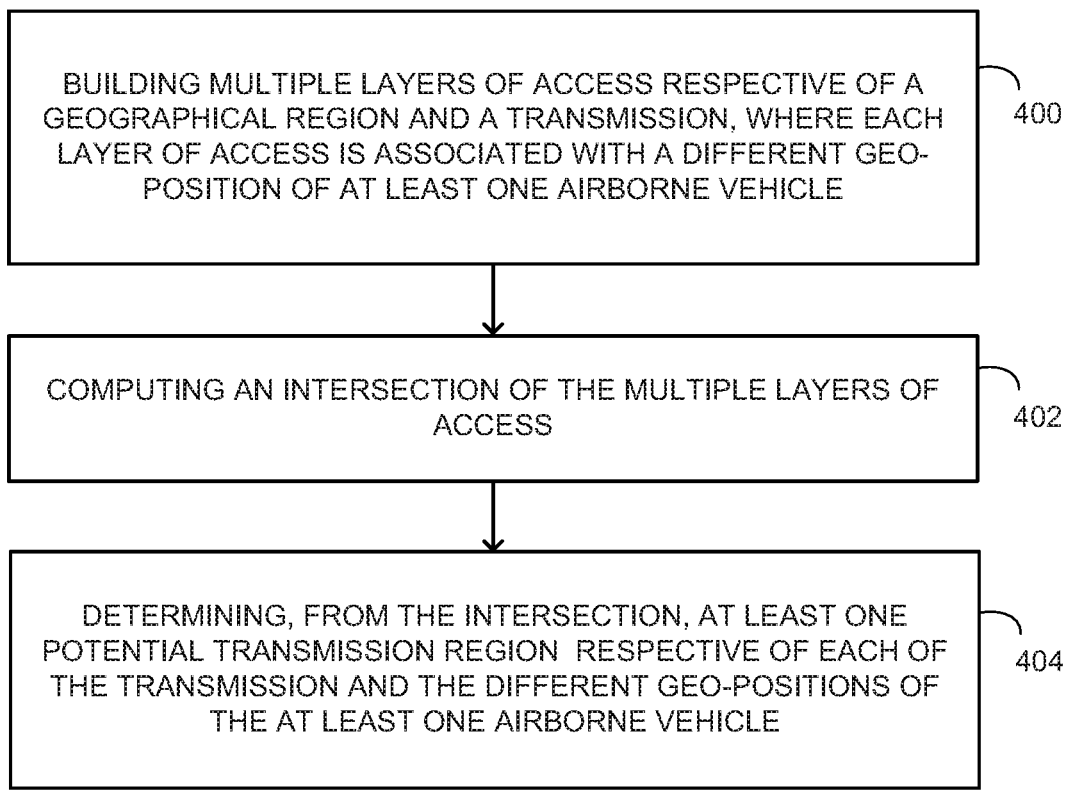
FIGS. 4A-4B, taken together, are a schematic illustration of a method for determining a potential transmission region, constructed and operative in accordance with an embodiment of the disclosed technique.
Figure 4B:
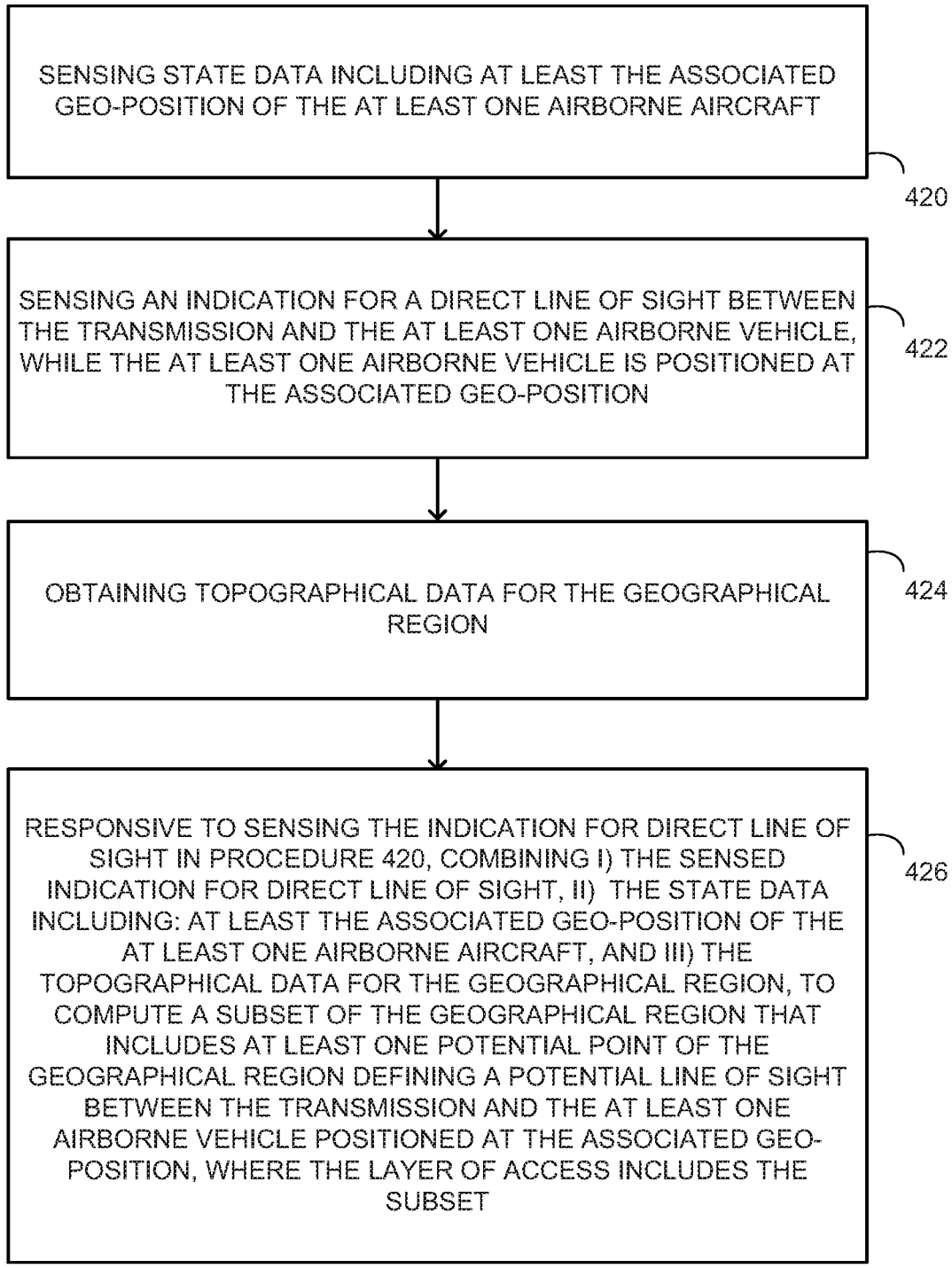

Reference is now made to FIGS. 4A-4B, which taken together, are a schematic illustration of a method for determining a potential transmission region, constructed and operative in accordance with an embodiment of the disclosed technique. FIG. 4A illustrates a general method to determine a potential transmission region, and FIG. 4B illustrates a more detailed implementation for procedure 400 of FIG. 4A.

With reference to FIG. 4A, in procedure 400, multiple layers of access respective of a geographical region and a transmission are built, where each layer of access of the multiple layers of access is associated with a different geo-position of at least one airborne vehicle. In some embodiments, the transmission is any of: a threat signal; and a distress signal. The at least one airborne vehicle may be any of: a fixed wing aircraft; a helicopter; a drone; and a surveillance balloon. The transmission may be any combination of: an optical signal; a radio signal; a LIDAR signal; a RADAR signal; an acoustic signal, an ultrasound signal, a thermal signal, and any of a distance, amplitude and velocity associated with a projectile. With reference to the system of FIGS. 1A-1G, computer 110 builds multiple layers of access respective of geographical region 104 and a transmission by transmitter 106. Each of the multiple layers of access is associated with a different geo-position of airborne vehicle 102. For example, Layer(P(T1)) 220 of FIG. 1B is associated with geo-position P(T1) of airborne vehicle 102 at time T1, as shown in FIG. 1A, whereas Layer(P(T2)) 222 of FIG. 2B is associated with geo-position P(T(2)) of airborne vehicle 102 at time T2, as shown in FIG. 1C.

In procedure 402, an intersection of the multiple layers of access is computed. With reference to the system of FIGS. 1A-1G, and the system of FIG. 2, computer 110 creates superimposition 224, shown in FIG. 1E, by overlaying layer of access Layer(P(T1)) associated with geo-position P(T1), and shown in FIG. 1B, with layer of access Layer(P(T2)) associated with geo-position P(T2), and shown in FIG. 1D. Thus, representative sub-regions 208A(T1), 208B(T1), and 208C(T1) defining Layer(P(T1)) of FIG. 1B are overlaid on representative sub-regions 208A(T2) and 208B(T2) defining Layer(P(T2)) of FIG. 1D. Computer 110 computes overlap regions 224A and 224B by determining those points that are common to both respective representative sub-regions 208A(T1), 208B(T1), and 208C(T1) and representative sub-regions 208A(T2) and 208B(T2), such as by performing a logical AND operation. Computer 110 computes intersection 226 of FIG. 1F by extracting overlap regions 224A and 224B from superimposition 224 of FIG. 1E, and stores superimposition 224. Computer 110 may display any of representative layers of access Layer(P(T1)) and Layer(P(T2)); superimposition 224; and intersection 226 on UI 266 of computer 210.

In procedure 404, at least one potential transmission region, respective of the transmission and each of the different geo-positions of the at least one airborne vehicle, is determined from the intersection. With reference to the system of FIG. 1G, computer 110 maps overlap regions 224A and 224B of FIG. 2E onto geographic region 104, as corresponding regions 124A and 124B on respective peaks 108A and 108B. Computer 110 determines that at least one of regions 124A and 124B are a potential transmission region for transmitter 106, respective of the geo-position of airborne vehicle 102 at time T1, indicated by an "X" 126, and the geo-position of airborne vehicle 102 at time T2, indicated by an "X" 128. Optionally, Computer 110 displays indications for regions 124A and 124B on UI 366. In one embodiment, UI 366 is an augmented reality display, and regions 124A and 124B are displayed as features overlaid on a real-time rendition of geographic region 104.

With reference to FIG. 4B, a more detailed implementation for building each one of the layers of access of procedure 400 of FIG. 4A is now described.

In procedure 420, state data of the at least one airborne vehicle comprising at least the geo-position associated with the one layer of access is sensed. In some embodiments, the state data further includes any combination of: a time stamp indicating the time of sensing of the indication for the direct line of sight; a heading measurement for the at least one airborne vehicle; an altitude measurement for the at least one airborne vehicle; a pose measurement for the at least one airborne vehicle; a velocity measurement for the at least one airborne vehicle; and an acceleration measurement for the at least one airborne vehicle. In some embodiments, the sensed indication is a binary indication for the existence of a direct line of sight. With reference to the system of FIGS. 1A-1C and the system of FIG. 2, processor 230 applies measurements acquired by any of 3D accelerometer 256, gyroscope 258, compass 260, GPS 262, and camera 252 to determine at least the geo-positions of airborne vehicle 102 at time T1, shown in FIG. 1A, and at time T2, shown in FIG. 1B. Processor 230 may additionally use any of the above measurements, and any additional measurements acquired via one or more components of transceiver 232 to determine the heading, pose, velocity, and acceleration of airborne vehicle 102.

In procedure 422, an indication, such as a binary indication for a direct line of sight between the transmission and the at least one airborne vehicle is sensed, while the at least one airborne vehicle is positioned at the geo-position associated with the one layer of access. With reference to the system of FIGS. 1A-1C and the system of FIG. 2, transmission sensor 242 senses an indication for direct line of sight between a transmission by transmitter 106 and airborne vehicle 102. For example, long RF range transceiver 238 may sense a radio signal transmitted by transmitter 106. Additionally or alternatively, LIDAR detector 244 may sense a LIDAR signal transmitted by transmitter 106. Additionally or alternatively, RADAR antenna 246 may sense a RADAR signal transmitted by transmitter 106. Additionally or alternatively, thermal detector 248 may sense a thermal signal transmitted by transmitter 106. Additionally or alternatively, acoustic detector 250A may detect an acoustic signal transmitted by transmitter 106. Additionally or alternatively, US detector 250B may detect a US signal transmitted by transmitter 106. Additionally or alternatively, camera 252 may detect an optical signal transmitted by transmitter 106. Processor 230 applies at least one of the above detected signals to determine binary indications for direct line of sight 112A(T1), 112B(T1), and 112C(T1) between transmitter 106 and airborne vehicle 102 while airborne vehicle is positioned at geo-position P(T1), as shown in FIG. 1A. Similarly, processor 230 applies at least one of the above detected signals to determine binary indications for direct line of sight 112A(T2) and 112B(T2) between transmitter 106 and airborne vehicle 102 while airborne vehicle is positioned at geo-position P(T2), as shown in FIG. 1B.

In procedure 424, topographical data for the geographical region is obtained. With reference to the system of FIGS. 1A-1B and FIG. 2, processor 230 obtains topographical data for geographical region 104 from memory 264.

In procedure 426, responsive to sensing the indication for the direct lines of sight while the airborne vehicle is positioned at the geo-position associated with the one layer of access, i) the binary indication for the direct lines of sight is combined with ii) state data including at least the associated geo-position of the at least one airborne vehicle and iii) the topographical data for the geographical region, to compute a subset of the geographical region. The subset of the geographic region includes at least one potential point of the geographical region defining a potential line of sight between the transmission and the airborne vehicle positioned at the associated geo-position. Each associated layer of access described above includes the subset of the geographical region.

With reference to the system of FIGS. 1A, 1B and 2, while airborne vehicle 102 is positioned at geo-position P(T1), transmission sensor 242 senses respective indications for direct lines of sight 112A(T1), 112B(T1), and 112C(T1). Responsive to the sensing by transmission sensor 242, processor 230 obtains state data including at least geo-position P(T1) from geo-positioning unit 254. Processor 230 additionally obtains topographical data for geographical region 104 from memory 264. Processor 230 combines i) indications for direct lines of sight 112A(T1), 112B(T1), and 112C(T1), ii) the state data including at least geo-position P(T1), and the topographical data to compute the subset comprising the union of sub-regions 108A(T1), 108B(T1), and 108C(T1) of geographical region 104. The subset of geographic region 104, comprising the union of sub-regions 108A(T1), 108B(T1), and 108C(T1), includes at least one potential point of geographical region 104 defining a potential line of sight between the transmission by transmitter 106 and airborne vehicle 102 positioned at the associated geo-position P(T(1)). As shown in FIG. 1B, layer of access Layer (P(T1)) 220 includes three representative sub-regions 208A(T1), 208B(T1) and 208C(T1) of representation 204 of geographical region 104, and corresponding to respective sub-regions 108A(T1), 108B(T1) and 108C(T1) of peaks 108A, 108B, and 108C, shown in FIG. 1A.

With reference to the system of FIGS. 1C, 1D and 2, while airborne vehicle 102 is positioned at geo-position P(T2), transmission sensor 242 senses respective indications for direct lines of sight 112A(T2) and 112B(T2). Responsive to the sensing by transmission sensor 242, processor 230 obtains state data including at least geo-position P(T2) from geo-positioning unit 254. Processor 230 additionally obtains topographical data for geographical region 104 from memory 264. Processor 230 combines i) indications for direct lines of sight 112A(T2) and 112B(T2), ii) the state data including at least geo-position P(T2), and the topographical data to compute a subset comprising the union of sub-regions 108A(T2) and 108B(T2) of geographical region 104. The subset of geographic region 104, comprising the union of sub-regions 108A(T2) and 108B(T2) includes at least one potential point of geographical region 104 defining a potential line of sight between the transmission by transmitter 106 and airborne vehicle 102 positioned at the associated geo-position P(T(1)). As shown in FIG. 1D, layer of access Layer (P(T2)) includes two representative sub-regions 208A(T2) and 208B(T2) of representation 204 of geographical region 104, and corresponding to respective sub-regions 108A(T2) and 108B(T2) of peaks 108A and 108B, shown in FIG. 1B.

It will be appreciated by persons skilled in the art that the disclosed technique is not limited to what has been particularly shown and described hereinabove. Rather the scope of the disclosed technique is defined only by the claims, which follow.

The invention claimed is:

1. A method for automatically determining at least one potential transmission region, comprising:

acquiring multiple binary indications for a direct line of sight between a transmitter and at least one airborne vehicle respective of multiple geo-positions of said at least one airborne vehicle;

acquiring each of said multiple geo-positions of said at least one airborne vehicle respective of each of said multiple binary indications for said direct line of sight;

for each one of said acquired geo-positions of said at least one airborne vehicle for said binary indication for said direct line of sight,
  determining a layer of access respective of topographical data for said geographical region and said one of said multiple acquired geo-positions, as a subset of said geographical region that includes at least one potential point of said geographical region defining a potential line of sight between said transmitter and said at least one airborne vehicle, thereby determining multiple layers of access;

determining an intersection of said multiple layers of access; and determining, from said intersection, said at least one potential transmission region respective of said transmitter and each of said different geo-positions of said at least one airborne vehicle.

2. The method of claim 1, wherein acquiring said geo-position further comprises acquiring data including a parameter selected from the group consisting of: a time stamp associated with said sensing of said binary indication for said direct line of sight; a heading measurement for said at least one airborne vehicle; an altitude measurement for said at least one airborne vehicle; a pose measurement for said at least one airborne vehicle; a velocity measurement for said at least one airborne vehicle; and an acceleration measurement for said at least one airborne vehicle.

3. The method of claim 1, wherein said transmitter is configured to transmit a signal selected from the group consisting of: a threat signal; and a distress signal.

4. The method of claim 1, wherein said at least one airborne vehicle is selected from the group consisting of: a fixed wing aircraft; a helicopter; a drone; and a surveillance balloon.

5. The method of claim 1, wherein said transmitter is configured to transmit a signal selected from the group consisting of: an optical signal; a radio signal; a lidar signal; a radar signal, an acoustic signal, an ultrasound signal, a thermal signal; and any of a distance, amplitude, velocity, and acceleration associated with a projectile.

6. A system for automatically determining at least one potential transmission region, comprising:
  a memory unit configured to store topographical data for a geographical region;
  at least one first sensor configured to sense a signal from a transmitter at multiple geo-positions of at least one airborne vehicle;
  at least one second sensor configured to sense said multiple geo-positions of said at least one airborne vehicle; and
  at least one processor configured to:
  acquire multiple binary indications for a direct line of sight between said transmitter and said at least one airborne vehicle respective of said sensed signal at said multiple geo-positions,
  acquire said multiple geo-positions of said at least one airborne vehicle respective of said multiple binary indications for said direct line of sight,
  for each one of said multiple acquired geo-positions of said at least one airborne vehicle respective of said binary indication for said direct line of sight,
    determine a layer of access respective of said topographical data for said geographical region and said one of said multiple acquired geo-positions, as a subset of said geographical region that includes at least one potential point of said geographical region defining a potential line of sight between said transmission and said at least one airborne vehicle,
  thereby determining multiple layers of access,
  determine an intersection of said multiple layers of access, and
  determine, from said intersection, said at least one potential transmission region respective of said transmitter and each of said multiple geo-positions of said at least one airborne vehicle.

7. The system of claim 6, further comprising said at least one airborne vehicle, said at least one airborne vehicle provided with said at least one processor, said memory unit, said at least one first sensor, and said at least one second sensor.

8. The system of claim 7, wherein said at least one second sensor is selected from the group consisting of: a compass, a GPS unit, a 3D accelerometer, a gyroscope, and a camera.

9. The system of claim 7, wherein said at least one first sensor is selected from the group consisting of: a long range radio antenna, a lidar detector, a radar antenna, a thermal detector, an acoustic detector, an ultrasound detector, and a camera.

10. The system of claim 6, further comprising a user interface configured to display said at least one potential transmission region respective of each of said different geo-positions of at least one airborne vehicle.

* * * * *